(12) United States Patent
Ibrahim et al.

(10) Patent No.: US 10,544,587 B2
(45) Date of Patent: Jan. 28, 2020

(54) COMPOSITE WALL PANEL

(71) Applicant: KING FAHD UNIVERSITY OF PETROLEUM AND MINERALS, Dhahran (SA)

(72) Inventors: Mohammed Ibrahim, Dhahran (SA); Aftab Ahmad, Dhahran (SA); Mohammed Salihu Barry, Dhahran (SA); Luai M. Alhems, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 157 days.

(21) Appl. No.: 15/920,489

(22) Filed: Mar. 14, 2018

(65) Prior Publication Data

US 2019/0284804 A1    Sep. 19, 2019

(51) Int. Cl.
```
E04C 2/288    (2006.01)
E04C 2/52     (2006.01)
E04B 1/04     (2006.01)
E04B 1/76     (2006.01)
C04B 28/02    (2006.01)
C04B 16/08    (2006.01)
C04B 14/18    (2006.01)
```
(Continued)

(52) U.S. Cl.
CPC ............. *E04C 2/2885* (2013.01); *B32B 3/06* (2013.01); *B32B 3/26* (2013.01); *B32B 13/04* (2013.01); *C04B 14/185* (2013.01); *C04B 16/08* (2013.01); *C04B 18/027* (2013.01); *C04B 28/02* (2013.01); *E04B 1/043* (2013.01); *E04B 1/7608* (2013.01); *E04C 2/46* (2013.01); *E04C 2/521* (2013.01); *B32B 2250/03* (2013.01); *B32B 2264/0235* (2013.01); *B32B 2305/022* (2013.01); *B32B 2307/302* (2013.01); *B32B 2307/72* (2013.01); *B32B 2607/00* (2013.01); *C04B 2111/00612* (2013.01); *C04B 2111/40* (2013.01); *C04B 2201/30* (2013.01); *C04B 2201/32* (2013.01); *E04C 2002/004* (2013.01)

(58) Field of Classification Search
CPC .............................. B32B 13/00; E04C 2/2885
See application file for complete search history.

(56) References Cited

U.S. PATENT DOCUMENTS 9,249,053 B2    2/2016  Leung et al.
2002/0112427 A1*  8/2002  Baldwin ................... 52/309.4
(Continued)

FOREIGN PATENT DOCUMENTS

DE    1947341 A1 *  3/1971
RU    2 208 102 C1    7/2003

OTHER PUBLICATIONS

Ayse Kaya, et al., "Properties of concrete containing waste expanded polystyrene and natural resin", Construction and Building Materials, vol. 105, Feb. 15, 2016, 4 pages.

(Continued)

*Primary Examiner* — Babajide A Demuren
(74) *Attorney, Agent, or Firm* — Oblon, McClelland, Maier & Neustadt, L.L.P.

(57) ABSTRACT

A composite wall panel comprising a panel frame and an insulating layer disposed therein, and a wall assembly comprising a plurality of the composite wall panels that are vertically jointed to one another. Various embodiments and combinations of embodiments are provided.

20 Claims, 27 Drawing Sheets

(51) Int. Cl.
*C04B 18/02* (2006.01)
*B32B 3/26* (2006.01)
*B32B 13/04* (2006.01)
*B32B 3/06* (2006.01)
*E04B 2/00* (2006.01)
*E04C 2/00* (2006.01)
*C04B 111/40* (2006.01)
*C04B 111/00* (2006.01)

(56) References Cited

U.S. PATENT DOCUMENTS

| | | | |
|---|---|---|---|
| 2004/0088940 A1* | 5/2004 | LeJeune et al. | 52/511 |
| 2006/0000172 A1 | 1/2006 | Sumrall | |
| 2008/0115442 A1 | 5/2008 | Cheng | |
| 2011/0305868 A1* | 12/2011 | Heytens et al. | B32B 3/12 428/116 |
| 2014/0165490 A1* | 6/2014 | Propst | E04C 2/296 52/479 |
| 2018/0155246 A1* | 6/2018 | Prante et al. | C04B 28/18 |

OTHER PUBLICATIONS

K. N. Lakshmikandhan, et al., "Investigation on Wall Panel Sandwiched With Lightweight Concrete", IOP Conference Series: Materials Science and Engineering, vol. 225, Sep. 2011, 16 pages.

"Sandwich AAC Wall Panels", Satec Envir Engineering (I) Pvt. Ltd. http://www.satec.co.in/sandwich-wall-panels.php, 11 pages.

"EPS Cement Sandwich Panels (FPB)", Bo Yue Jia, http://www.byjbuilding.com/products/eps-cement-sandwich-panels, 7 pages.

* cited by examiner

COMPOSITE WALL PANEL

BACKGROUND OF THE INVENTION

Technical Field

The present invention relates to a composite wall panel with a panel frame and an insulating layer disposed therein.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Innovative, environmentally friendly and ready-to-use building composites (e.g., composite compositions) that provide a combination of high efficiency, quality and improved thermal resistance have long been sought. This search has been ongoing in an environment if increased demands on the both thermal and mechanical performance of new building products.

Demand for new low-cost and efficient building materials has increased together with an increasing population, leading to a chronic shortage of easily accessible (affordable) building materials. Engineers have attempted to address these shortages and by utilizing industrial by-products in the formulation and production of useful building materials.

The increase in the popularity of using environmentally friendly, low cost and lightweight construction materials in the building industry brings the need for searching more innovative, flexible and versatile composites for a variety of applications. Important aspects of prior studies are in the development of integrated insulation products such as the insulated, reinforced concretes, precast sandwich wall panels, rubberized concretes, etc. Part of this interest is to establish the thermal performance of the wall panels and building structures.

Several methods have been proposed in the past to improve thermal conductivity of concrete building structures, for example, by using Autoclaved Aerated Concrete (AAC) blocks or lightweight aggregate concrete blocks in the structure of those buildings. In separate studies, the average thermal conductivity of these buildings further improved by installing triple glazed glass façade, low volatile organic compound paints, or low emission carpet tiles. However, each of these measures has its own shortcomings. For instance, manufacturing autoclaved aerated concrete requires a special manufacturing plant nearby. Also, AAC blocks are primarily used for non-load bearing walls. Furthermore, the lightweight aggregate concrete blocks need expensive aggregates for production and the strength of such concrete blocks are generally proportional to their unit weight.

One approach for increasing an average thermal conductivity of a building is to use load bearing wall panels having an expanded polystyrene board placed in the middle (core) of the panels. These wall panels are generally pre-fabricated, since they cannot be fabricated on-site, and therefore transportation and installation could be very costly. In addition, the expanded polystyrene boards are brittle, and they do not form bonds with nearby walls, when placed in the core of the wall panels. Moreover, these wall panels cannot completely surround utility lines, and thus formation of empty spaces (gaps) is unavoidable in these wall panels, leading to relatively poor thermal performance.

In view of the forgoing, one objective of the present disclosure is to provide a composite wall panel with a panel frame and an insulating layer disposed therein, wherein the insulating layer can substantially surround utility lines, when present, without forming gaps in the composite wall panel. Another objective of the present disclosure relates to a wall assembly that comprises a plurality of the composite wall panels that are vertically jointed to one another.

BRIEF SUMMARY OF THE INVENTION

According to a first aspect, the present disclosure relates to a composite wall panel, comprising i) a panel frame including a) a first planar concrete block, b) a second planar concrete block that is disposed substantially parallel to the first planar concrete block, c) a first spacer and a second spacer, wherein the first and the second spacers are oriented axially with a long dimension of the first and the second planar concrete blocks and between the first and the second planar concrete blocks to form a cavity in the panel frame, ii) an insulating layer disposed in the cavity, wherein the insulating layer is formed from a concrete mixture that comprises a) 45-55 wt % of cement, b) 30-35 wt % of an aggregate, c) 0.5-2.5 wt % of expanded polystyrene beads, d) 0.5-5.0 wt % of a foam cement, e) 12-18 wt % of water, f) 0.1-0.5 wt % of a superplasticizer, relative to the total weight of the insulating layer.

In one embodiment, at least one aperture is present in the first and/or the second spacer.

In one embodiment, at least one aperture is present in the first spacer and at least one aperture is present in the second spacer.

In one embodiment, the first and the second spacers are vertically secured between the first and the second planar concrete blocks to form a tongue-groove structure in the panel frame.

In one embodiment, each of the first planar concrete block and the second planar concrete block has a thickness ranging from 20 to 100 mm.

In one embodiment, the insulating layer has a thickness ranging from 10 to 80 mm.

In one embodiment, the composite wall panel has a thermal conductivity of 0.3-0.35 W/(m·K) as determined by ASTM C 177.

In one embodiment, the composite wall panel has a compressive strength in the range of 35-45 MPa as determined by ASTM C 150.

In one embodiment, the composite wall panel has a unit weight of 1700-1900 kg/m$^3$.

In one embodiment, an average diameter of the expanded polystyrene beads is 1-10 mm.

In one embodiment, the aggregate is sand with an average particle size of less than or equal to 1.0 mm.

In one embodiment, the superplasticizer is a polycarboxylate ether.

In one embodiment, compositions of the first spacer, the second spacer, the first planar concrete block, and the second planar concrete block are substantially the same.

In one embodiment, each of the first planar concrete block and the second planar concrete block includes a) cement, b) a fine aggregate, c) a coarse aggregate comprising expanded perlite, d) water, wherein a weight ratio cement to water ranges from 3:1 to 1:1, wherein a weight ratio of the coarse aggregate to the fine aggregate ranges from 2:1 to 1:2, and wherein the coarse aggregate is present in the mortar at a weight percent of 5-20 wt %, relative to the total weight of the mortar.

In one embodiment, the cement has a unit weight of 300-500 kg/m³, the fine aggregate has a unit weight of 600-800 kg/m³, and the coarse aggregate has a unit weight of 1000-1300 kg/m³.

In one embodiment, an average particle size of the fine aggregate is less than or equal to 1 mm and an average particle size of the coarse aggregate is greater than 1 mm.

According to a second aspect, the present disclosure relates to a wall assembly, comprising a plurality of the composite wall panels that are vertically jointed to one another via the tongue-groove structures, wherein the at least one aperture of the first spacer is located next to the at least one aperture of the second spacer of an adjacent composite wall panel.

In one embodiment, a utility line is embedded in the insulating layer of the plurality of the composite wall panels.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
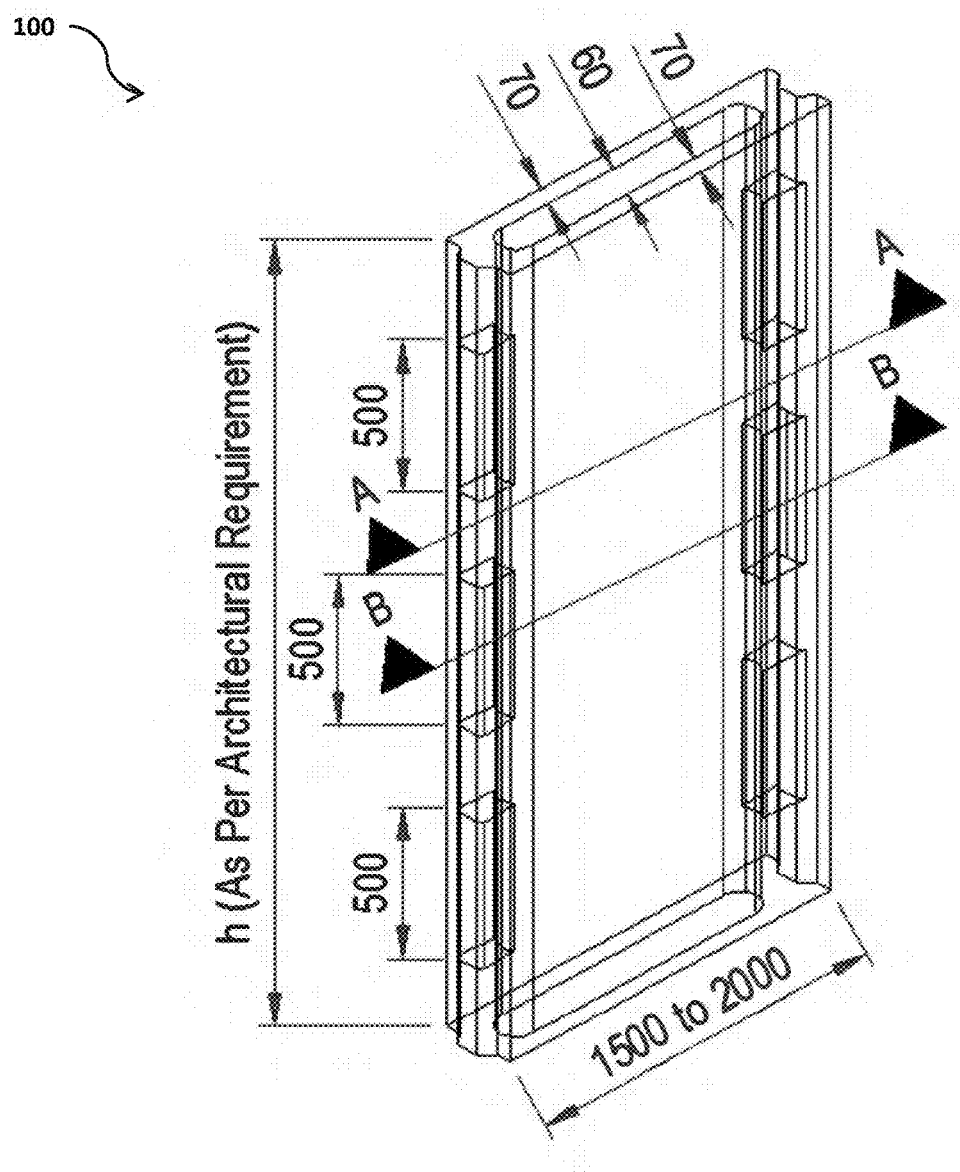
FIG. 1A illustrates an isometric view of a composite wall panel.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used in this disclosure, the term "substantially the same" refers to an embodiment or embodiments where a difference between two quantities are no more than 2%, preferably no more than 1%, preferably no more than 0.5% of the smaller value of the two quantities.

According to a first aspect, the present disclosure relates to a composite wall panel 100. The term "composite wall panel" refers to a structure that includes a panel frame 102 with a cavity and an insulating layer 112, which is disposed in the cavity.

The insulating layer 112 is formed from a concrete mixture that comprises at least cement, an aggregate, expanded polystyrene beads, a foam cement, water, and a superplasticizer. In terms of the present disclosure, the concrete mixture refers to a water-containing precursor of the insulating layer, which is a precursor of the insulating layer before setting. Also, the term "concrete" as used in this disclosure refers to a composite material composed of aggregates bonded together with a concrete mixture which hardens over time.

In a preferred embodiment, the concrete mixture includes 45-55 wt %, preferably 46-52 wt %, preferably about 50 wt % of cement, relative to the total weight of the concrete mixture. As used herein, the term "cement" refers to a substance that sets and hardens and can bind other materials together. The cement, as used herein, may be a non-hydraulic cement, a hydraulic cement, or mixtures thereof, preferably a hydraulic cement. Non-hydraulic cement may not set in wet conditions or underwater; rather, it sets as it dries and reacts with carbon dioxide in the air and may be affected by some aggressive chemicals after setting. In contrast, hydraulic cement sets in the presence of water, e.g. in wet conditions or underwater.

Any type of cement or cement containing material may be used in any of the embodiments disclosed herein. For example, the cement may include Type I, Type Ia, Type II, Type IIa, Type III, Type IIIa, Type IV, Type V Portland cements (as recognized by either ASTM C 150 or European EN-197 standard), hydraulic cements, non-hydraulic cements, Portland flyash cements, Portland pozzolan cements, Portland silica fume cements, masonry cements, EMC cements, stuccos, plastic cements, expansive cements, white blended cements, pozzolan-lime cements, slag-lime cements, supersulfated cements, calcium aluminate cements, calcium sulfoaluminate cements, geopolymer cements, Rosendale cements, a polymer cement mortar, a lime mortar, and/or a pozzolana mortar. In a preferred embodiment, the cement has a unit weight of 300-500 kg/m$^3$, preferably 320-450 kg/m$^3$, preferably 350-400 kg/m$^3$, preferably about 370 kg/m$^3$.

In some embodiments, $SiO_2$ may be present in the cement. Alternatively, the cement may include $SiO_2$-containing materials including but not limited to belite ($2CaO.SiO_2$), alite ($3CaO.SiO_2$), celite ($3CaO.Al_2O_3$), or brownmillerite ($4CaO.Al_2O_3.Fe_2O_3$). In addition, sand may also be present in the cement in an amount of up to 50 wt %, preferably up to 40 wt %, preferably up to 30 wt %, preferably up to 20 wt %, preferably up to 15 wt %, preferably up to 10 wt %, preferably up to 5 wt %, with a minimum amount of 0.5 wt %, preferably 1.0 wt %. In some embodiments, the cement may comprise 40-80 wt % of tricalcium silicate (($CaO)_3.SiO_2$, $C_3S$ in cement notation), preferably 45-75 wt %, preferably 50-70 wt %, preferably 52-65 wt %, preferably 54-60 wt %, relative to the total weight of the cement. In some other embodiments, the cement may comprise 5-40 wt % of dicalcium silicate (($CaO)_2.SiO_2$, $C_2S$ in cement notation), preferably 6-35 wt %, preferably 7-32 wt %, preferably 10-30 wt %, preferably 12-25 wt %, preferably 14-20 wt %, relative to the total weight of the cement. In still further embodiments, the cement may comprise 0.1-20 wt %/o of tricalcium aluminate (($CaO)_3.A_2O_3$, $C_3A$ in cement notation), preferably 1-15 wt %, preferably 2-13 wt %, preferably 4-12 wt %, preferably 6-10 wt %, relative to the total weight of the cement. Yet in some embodiments, the cement may comprise 0.1-22 wt % of tetracalcium aluminoferrite (($CaO)_4.Al_2O_3.Fe_2O_3$, $C_4AF$ in cement notation), preferably 1-20 wt %, preferably 5-18 wt %, preferably 6-16 wt %, preferably 8-14 wt %, preferably 10-12 wt %, relative to the total weight of the cement.

In a preferred embodiment, the cement is a hydraulic cement, which sets when mixed with water by way of a complex series of chemical reactions. When the hydraulic cement is mixed with water, different constituents slowly crystallize and interlocking of formed crystals gives cement its strength. Therefore, at least a portion of the water chemically reacts with the cement during curing. Also, carbon dioxide may slowly absorb to convert constituents, e.g. Portlandite ($Ca(OH)_2$), into soluble calcium carbonate. The cement may be set in a few hours and hardens over a period of weeks, after being mixed with water. These processes can vary widely depending on the cement used and curing conditions. Immersion of the cement in warm water, after initial setting, may speed up the curing. In some embodiments, gypsum may be added as an inhibitor to prevent flash setting. In principle, the strength continues to rise slowly as long as water is available for continued hydration and curing. In a preferred embodiment, the concrete mixture includes water ranging from 10-20 wt %, preferably 11-18%, preferably 12-16 wt %, preferably 14-15 wt %, preferably about 14.5 wt % relative to the total weight of the concrete mixture. In some embodiments, water is mixed with the cement in a weight ratio of 0.3-0.8, preferably 0.33-0.7, preferably 0.35-0.6, preferably 0.38-0.5, preferably about 0.4 to form the concrete mixture. A water to cement ratio below 0.3 may yield a stronger and more durable concrete mixture, whereas a water to cement ratio above 0.8 may give a freer flowing concrete mixture with a higher slump. The water may be supplied from a natural source, such as aquifers, lakes, oceans, bays, rivers, creeks, and/or underground water resources. The water may be filtered to remove large solids before mixed with the cement. Wastewater may also be used to make the concrete herein, but may cause problems when setting or may cause premature failure of the concrete mixture.

The concrete mixture further includes 30-35 wt %, preferably 31-34 wt %, preferably about 33 wt % of an aggregate, relative to the total weight of the concrete mixture. As used herein, the aggregate preferably refers to a broad category of particulate materials that are used as fillers to add strength to the insulating layer 112 and/or other concrete structures of the present disclosure. Exemplary aggregates include crushed recycled concrete (e.g. aggregates from construction, demolition, and excavation waste), gravel, rocks, natural soil, quarried crushed mineral aggregates from igneous, metamorphic or sedimentary rocks, including unused and waste aggregates from quarry operations, gravel, dredged aggregates, china clay stent, china clay wastes, natural stone, recycled bituminous pavements, recycled concrete pavements, reclaimed road base and subbase materials, crushed bricks, construction and demolition wastes, waste/recycled flue gas ashes, crushed glass, slate waste, waste plastics, egg shells, sea shells, and mixtures thereof. The aggregate may preferably serve as a reinforcement to add strength to the insulating layer 112. The presence of the aggregate may also increase a durability of the insulating layer (e.g. by increasing a toughness of the insulating layer), and also reduces a maintenance cost. Shape of the aggregates of the present disclosure may be cubical, rectangular, rounded, spherical, etc. In some embodiments, a portion of the aggregates have irregular shapes. Surface texture of the aggregates may range from relatively smooth with small exposed pores to irregular with small to large exposed pores. In one embodiment, the aggregate is crushed recycled concrete. The crushed recycled concrete may be made by crushing, grinding, pulverizing, etc. any concrete material including concrete compositions having sand as an aggregate, or more preferably a concrete without having an aggregate.

In some embodiments, the aggregates may be classified as "fine aggregates" and "coarse aggregates, based upon an average particle size of the aggregate, as defined in ASTM C 330. As used herein, the term "average particle size" refers to the longest linear dimension of the particle. In terms of the present disclosure, a "fine aggregate" refers to an aggregate with an average particle size of less than or equal to 1 mm, preferably less than 900 µm, preferably less than 800 µm, preferably less than 750 µm, preferably in the range of 100-700 µm, preferably 200-650 µm, preferably 250-600 µm. In terms of the present disclosure, a "coarse aggregate" refers to an aggregate with an average particle size of greater than 1 mm, preferably greater than 2 mm, preferably 2-18 mm, preferably 3-15 mm, preferably 4-12 mm, preferably 5-10 mm.

Exemplary fine aggregates that may be used in the concrete mixture include, without limitation, sand, dune sand, mineral particles with natural or synthetic origins, pumice, expanded clays, expanded schists, expanded glasses, expanded aggregates based on marble, granite, slate, ceramic, and the like.

In some embodiments, fine aggregates are present in the concrete mixture, wherein the fine aggregates contain sand, preferably dune sand, with an average particle size of less than or equal to 1.0 mm, preferably 500-700 µm, preferably 525-675 µm, preferably 550-650 µm. As used herein, "sand" refers to a naturally occurring granular material composed of finely divided rock and mineral particles. Sand is finer than gravel and coarser than silt. The composition of sand may vary, depending on rock sources, but sand generally constitute silica (silicon dioxide, or $SiO_2$), for example, in the form of quartz. The sand preferably comprises 80-95 wt % of silicon dioxide ($SiO_2$ or silica), preferably 85-94 wt %, preferably 88-93 wt %, preferably 90-92 wt % relative to the total weight of the sand. The sand may contain calcium carbonate, for example, in the form of aragonite. The sand may also contain ferric oxide ($Fe_2O_3$), aluminum oxide ($Al_2O_3$), magnesium oxide (MgO), and potassium oxide ($K_2O$). These compounds may be present at a weight percent of less than 5 wt %, preferably less than 4 wt %, preferably less than 3 wt %, preferably 0.1-2.0 wt %, preferably 0.2-1.0 wt %, relative to the total weight of the sand. Other impurities may also be present in the sand including, without limitation, limestone, gypsum, sand stone, feldspar, granite, magnetite, chlorite, glauconite, basalts, iron, obsidian, and mixtures thereof. In some embodiments, the fine aggregate may be silicon dioxide sand, quarzitic silicon dioxide sand, and/or dune sand. In a preferred embodiment, the fine aggregates that are present in the concrete mixture may have a unit weight of 600-800 kg/m, preferably 620-750 $kg/m^3$, preferably 650-700 $kg/m^3$, preferably about 660 $kg/m^3$.

In some embodiments, coarse aggregates are present in the concrete mixture, wherein the coarse aggregates contain limestone. As used herein, limestone refers to a sedimentary rock composed largely of the minerals calcite and aragonite, which are different crystal forms or polymorphs of calcium carbonate ($CaCO_3$). Calcium carbonate exists naturally in formations throughout the world. The limestone may comprise at least 50 wt % of calcium carbonate, preferably at least 55 wt %, preferably at least 60 wt %, preferably at least 70 wt %, preferably at least 80 wt % relative to the total weight of the limestone, and up to 20 wt % of silicon dioxide, preferably up to 18 wt %, preferably up to 16 wt %, preferably up to 12 wt %, preferably up to 10 wt % relative to the total weight of the limestone. The limestone may further contain traces amounts (less than 2 wt %, preferably less than 1 wt %, preferably less than 0.5 wt % relative to the total weight of the limestone) of other materials including, but not limited to, quartz, feldspar, clay minerals, pyrite, siderite, chert, and the like. The limestone may preferably used without further purification or chemical modification. However, in some embodiments the limestone may be chemically or physically treated in order to modify or enhance its chemical or physical properties. For example, the limestone may be heated at temperatures sufficient to at least partially convert the calcium carbonate to calcium oxide and/or calcium hydroxide. The limestone may be subject to thermal treatment in the presence of cement and/or a zeolite which may function to exchange calcium for alumina within the mineral structure.

In some preferred embodiments, coarse aggregates are present in the concrete mixture, wherein the coarse aggregates contain perlite. As used herein, perlite refers to an amorphous volcanic glass with a relatively high water content, typically formed by the hydration of obsidian. Perlite occurs naturally and largely expands upon heating. The perlite of the present disclosure may refer to perlite or expanded perlite. Perlite softens when heated to temperatures of 800-900° C. Water trapped in the structure of perlite vaporizes, thus expanding the material to 7-16 times its original volume. The perlite may comprise 65-80 wt % of $SiO_2$, preferably 70-75 wt % of $SiO_2$; 10-18 wt % of $Al_2O_3$, preferably 12-15 wt % of $Al_2O$; 2-5 wt % of $Na_2O$, preferably 3-4 wt % of $Na_2O$; and 2-6 wt % of $K_2O$, preferably 3-5 wt % of $K_2O$, with each weight percent being relative to the total weight of the perlite. In certain embodiments, the perlite may further contain various elements including, but not limited to calcium, iron, magnesium, and oxides thereof in less than 2 wt %/o, preferably less than 1 wt % relative to the total weight of the perlite. In a preferred embodiment, the coarse aggregates that are present in the concrete mixture may have a unit weight of 1000-1300 $kg/m^3$, preferably 1100-1280 $kg/m^3$, preferably 1200-1250 $kg/m^3$, preferably about 1230 $kg/m^3$.

It is also envisaged that the other coarse aggregates may also be present in the concrete mixture in addition to, or in lieu of limestone and/or perlite. Exemplary coarse aggregates that may be used include, but are not limited to, scoria, pumice, shale, clays, slate, expanded clays, vermiculite, diatomite, schists, expanded schist and the like and mixtures thereof.

In one embodiment, the coarse aggregates and/or the fine aggregates of the present disclosure are treated with a surface treatment agent such as hydrogen peroxide to form treated aggregates that may have carboxylic sites, in order to interact with functional groups present in the concrete mixture containing water, aggregates, and cement. The aggregates may be treated by mixing with hydrogen peroxide, at sufficient concentrations e.g. 0.01-0.1 mM, at a temperature of about 65-85° C. while stirring for about 20 to 30 minutes.

In a preferred embodiment, the aggregate present in the concrete mixture and subsequently the insulating layer 112 consists of coarse aggregates, wherein the coarse aggregates contain perlite and limestone, and wherein a weight ratio of perlite to limestone ranges from 2:1 to 1:2, or 1.9:1 to 1:1.9, or 1.8:1 to 1:1.8, or 1.7:1 to 1:1.7, or 1.6:1 to 1:1.6, or 1.5:1 to 1:1.5, or 1.4:1 to 1:1.4, or 1.3:1 to 1:1.3, or 1.2:1 to 1:1.2, or 1.1:1 to 1:1.1, or about 1:1.

In a preferred embodiment, the aggregate present in the concrete mixture and subsequently the insulating layer 112 is a combination of fine aggregates and coarse aggregates, wherein a weight ratio of the fine aggregate to the coarse aggregate ranges from 2:1 to 1:2, or 1.9:1 to 1:1.9, or 1.8:1 to 1:1.8, or 1.7:1 to 1:1.7, or 1.6:1 to 1:1.6, or 1.5:1 to 1:1.5, or 1.4:1 to 1:1.4, or 1.3:1 to 1:1.3, or 1.2:1 to 1:1.2, or 1.1:1 to 1:1.1, or about 1:1.

The concrete mixture further includes 0.5-2.5 wt %, preferably 0.6-2.0 wt %, preferably 0.8-1.5 wt %, preferably about 1.0 wt % of expanded polystyrene beads, relative to the total weight of the concrete mixture.

In a preferred embodiment, the expanded polystyrene beads are rounded expanded polystyrene particles with an average diameter of 1-10 mm, preferably 2-6 mm, preferably 3-4 mm; a coefficient of variation of less than 35%, preferably less than 30%, preferably less than 25%, preferably less than 20%, preferably less than 15%, preferably less than 10%; and a particle size distribution ranging from 10% of the average particle size to 200% of the average particle size, preferably 50-150%, preferably 75-125%, preferably 80-120%. The expanded polystyrene beads of the present disclosure may have an average molecular weight of 2-500 kDa, preferably 5-400 kDa, preferably 10-300 kDa, preferably 50-250 kDa, and a degree of polymerization (DP) in the range of 100-2500, preferably 150-1500, preferably 200-750, preferably 250-500. As used herein, the degree of polymerization (DP) is defined as an average number of monomeric units in a macromolecule or polymer.

Exemplary polymeric materials or plastic materials that may be used in addition to, or in lieu of the expanded polystyrene beads include, but are not limited to, polyethylene, polypropylene, polyvinyl chloride, polyvinylidene chloride, polyacrylonitrile, high impact polystyrene, acrylonitrile butadiene styrene, polyethylene/acrylonitrile butadiene styrene, polycarbonate/acrylonitrile butadiene styrene, acrylic polymers, polybutadiene, polyisoprene, polyacetylene, silicones, synthetic rubbers and the like and copolymers and mixtures thereof. Preferably, the aforementioned polymer materials are present in the form of beads (i.e. spherical aggregates) with an average diameter of 1-10 mm, preferably 2-6 mm, preferably 3-4 mm. In certain embodiments, the aforementioned polymer materials may be present in other forms, such as, strands, fibers, flakes, fine aggregates with an average diameter of less than 1 mm, etc. In one embodiment, the expanded polystyrene beads may be formed from recyclable polymers and/or plastics that contain polystyrene, polyethylene, polypropylene and the like.

In one embodiment, the expanded polystyrene beads of the present disclosure are treated with a surface treatment agent such as hydrogen peroxide to form treated beads that may have more carboxylic sites than untreated beads. Functional groups present in the concrete mixture containing water, aggregates, and cement may interact with the carboxylic sites, thereby causing the treated beads to contact with and be suspended in the concrete mixture to a much greater degree than untreated beads. In certain embodiments, the expanded polystyrene beads are as small as possible so that they can remain suspended in the concrete mixture. In view of that, the expanded polystyrene beads may have an average diameter of less than 5 mm, preferably less than 4, preferably 1-3 mm. The expanded polystyrene beads may be treated by mixing them with hydrogen peroxide, at sufficient concentrations e.g. 0.01-0.05 mM, at a temperature of about 65-85° C. while stirring for about 20 to 30 minutes.

The concrete mixture further includes 0.5-5.0 wt %/o, preferably 0.8-4.0 wt %, preferably 1.0-3.0 wt %, preferably 1.2-2.0 wt %, preferably 1.5-1.8 wt % of a foam cement, relative to the total weight of the concrete mixture. The term "foam cement" as used herein refers to a cement based slurry, which includes 1-20 vol % relative to the total volume of the cement based slurry, preferably 2-10 vol %, preferably 3-5 vol % of a foaming agent mixed with water. The presence of the foam cement in the concrete mixture may form small air bubbles (e.g. with an average diameter of less than 500 μm, preferably 100-400 μm) in the insulating layer. The foam cement preferably does not include an aggregate. In one embodiment, the foaming agent is at least one compound selected from the group consisting of an alkyl sulfonate, an alkyl ether sulfonate, a hydroxyalkyl ether sulfonate, an alpha olefin sulfonate, an alkyl benzene sulfonate, an alkyl sulphate, an alkyl ether sulphate, a hydroxyalkyl ether sulphate, an alpha olefin sulphate, and an alkyl benzene sulphate. The foaming agent may be a commercially available product such as GENFIL®, Litho-Foam®, etc.

The concrete mixture further includes 0.1-0.5 wt/o, preferably 0.2-0.4 wt %/o, preferably about 0.3 wt % of a superplasticizer, relative to the total weight of the concrete mixture. As used herein, a "superplasticizer" refers to a chemical admixture to provide a well-dispersed particle suspension in the concrete mixture. The superplasticizer may be used to prevent particle segregation and to improve the flow characteristics of the concrete mixture. A superplasticizer is a plasticizer with fewer deleterious effects and can be used to increase workability more than is practical with traditional plasticizers. As used herein, a "plasticizer" is an additive that increases the plasticity or fluidity of slurry. Plasticizers increase the workability of "fresh" concrete, allowing it to be placed more easily, with less consolidating effort. The addition of a superplasticizer to the concrete mixture may allow reducing water to cement ratio, without affecting the workability of the concrete mixture, which may improve hardening performance, strength, and durability of the insulating layer.

In a preferred embodiment, the superplasticizer is a polycarboxylate, such as for example a polycarboxylate derivative with polyethylene oxide side chains, preferably the superplasticizer is a polycarboxylate ether (PCE) superplasticizer, such as for example the commercially available Glenium 51®. Polycarboxylate ether-based superplasticizers may allow a significant water reduction at a relatively low dosage, thereby providing good particle dispersion in the concrete mixture. Polycarboxylate ether-based superplasticizers are composed of a methoxy-polyethylene glycol copolymer (side chain) grafted with methacrylic acid copolymer (main chain).

The concrete mixture of the present disclosure may further contain other superplasticizers in addition to, or in lieu of a polycarboxylate ether based superplasticizer include, but are not limited to, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof.

Additional chemical admixtures may also present in the concrete mixture. The chemical admixtures may be mixed with the concrete mixture in the form of powder or fluids to give certain characteristics to the concrete mixture that are not obtainable without using them. Exemplary additional chemical admixtures that may be used here include, but are not limited to, accelerators, retarders, pigments, corrosion inhibitors, bonding agents, pumping aids and the like. As used herein, accelerators refer to chemical admixtures that speed up the hydration (hardening) of a concrete and may be useful for modifying the properties of concrete in cold weather. Exemplary accelerators include, but are not limited to, $CaCl_2$, $Ca(NO_3)_2$, and $NaNO_3$. As used herein, retarders, e.g. polyol retarders, refer to chemical admixtures that slow the hydration of a concrete and may be used in large-scale pours where partial hardening may be unavoidable without the presence of a retarder. Exemplary retarders include, but are not limited to, sugar, sucrose, sodium gluconate, glucose, citric acid, tartaric acid and the like. Pigments may be used to change the color of the concrete, for aesthetics. Corrosion inhibitors may be used to minimize the corrosion of metal part that may be used as reinforcement in the concrete mixture. Bonding agents (typically a polymer) may be used to create a bond between old and new concrete with wide temperature tolerance and corrosion resistance. Pumping aids may be used to improve pumpability, thicken the concrete mixture and reduce separation and bleeding.

In certain embodiments, the concrete mixture may include a viscosifying agent to modify rheological properties of the concrete mixture. Exemplary viscosifying agents include, but are not limited to, cellulose ethers, polysaccharides, hydroxyalkylcelluloses, hydroxyethylcelluloses, methylcellulose, carboxymethylcellulose, hydroxyethylcellulose or ethylhydroxyethylcellulose, polyethylene oxides, polyvinyl alcohols, polyamides and the like or mixtures thereof.

In certain embodiments, the insulating layer 112 may include one or more tensile reinforcements. The insulating layer is preferably strong in compression, as the aggregates efficiently carry compression loads, however it may not be as strong in tension as the cement holding the aggregates can crack, allowing the insulating layer to fail. Exemplary tensile reinforcements that may be used in the insulating layer include, but are not limited to, steel reinforcing bars, steel fibers, glass fibers, carbon fibers, carbon nanofibers, plastic fibers and the like or mixtures thereof to aid in carrying tensile loads.

In certain embodiments, the concrete mixture may include one or more mineral admixtures. The term "mineral admixture" as used herein refers to very fine grained inorganic materials that have pozzolanic or latent hydraulic properties that are added to improve the properties of the insulating layer. The use of mineral admixtures as partial replacements for cements may lower a preparation cost of the insulating layer, may improve the properties of the insulating layer, and may allow for recycling waste. The mineral admixture may preferably be silica fume and/or heavy oil ash. Silica fume is advantageous to improve the properties including, but not limited to, compressive strength, bond strength, and abrasion resistance of the insulating layer. As used herein, the silica fume (or microsilica) refers to an amorphous (non-crystalline) polymorph of silicon dioxide, silica. Also, "heavy oil ash" as used here is a residue resulting from combusting heavy oil and/or cracked oil. Alternative mineral admixtures that may be used in addition to, or in lieu of silica fume and/or heavy oil ash include, but are not limited to, limestone fillers, siliceous fillers, fly ash, ground and/or granulated blast furnace slags, metakaolins and the like and mixtures thereof.

In certain embodiments, the concrete mixture further includes, without limitation, one or more of stabilizers, processing aids, plasticizers, anti-statics, blowing agents, fillers, coupling agents, and the like.

Figure 2:
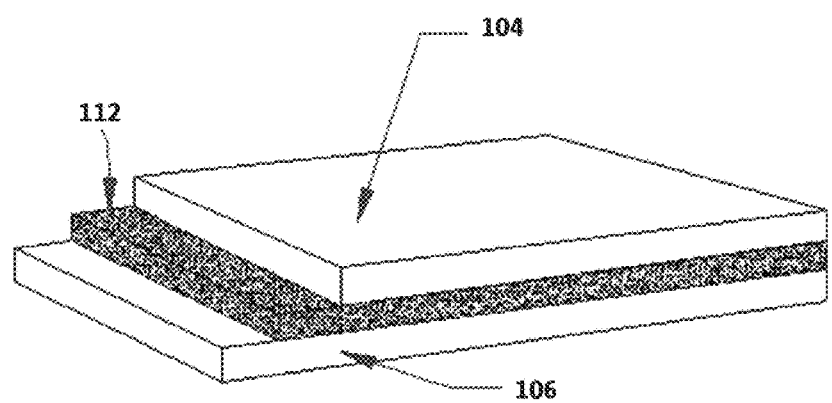
FIG. 2 illustrates a layer configuration of the composite wall panel.

The insulating layer 112 may be produced in various shapes, e.g. rectilinear, rectangular, cylindrical, conical, pyramidal, etc. In view of the present disclosure, the insulating layer has a rectangular geometry, as shown in FIG. 2, with a thickness ranging from 10 to 80 mm, preferably 30 to 75 mm, preferably 50 to 70 mm, preferably about 60 mm. A width and a length of the insulating layer may vary depending on the geometries of the panel frame 102.

The composite wall panel 100 of the present disclosure further includes the panel frame 102. The panel frame 102 includes a first planar concrete block 104 and a second planar concrete block 106 that is disposed substantially parallel to the first planar concrete block 104.

In some preferred embodiments, a shape and a composition of the first and the second planar concrete blocks are substantially the same. Accordingly, in one embodiment, each of the first planar concrete block 104 and the second planar concrete block 106 is formed from a concrete that includes cement, a fine aggregate, a coarse aggregate, and water. A weight ratio cement to water in the concrete may preferably range from 3:1 to 1:1, preferably 2.9:1 to 2:1, preferably 2.8:1 to 2.2:1, preferably about 2.5:1. A weight ratio of the coarse aggregate to the fine aggregate in the concrete may preferably range from 2:1 to 1:2, or 1.9:1 to 1:1.9, or 1.8:1 to 1:1.8, or 1.7:1 to 1:1.7, or 1.6:1 to 1:1.6, or 1.5:1 to 1:1.5, or 1.4:1 to 1:1.4, or 1.3:1 to 1:1.3, or 1.2:1 to 1:1.2, or 1.1:1 to 1:1.1, or about 1:1. The coarse aggregate may be present in the concrete at a weight percent of 5-20 wt %, preferably 8-18 wt %, preferably 10-15 wt %, relative to the total weight of the concrete. In a preferred embodiment, the coarse aggregate in the concrete is perlite (preferably expanded perlite), wherein the perlite is present in the concrete at a weight percent of 5-20 wt %, preferably 8-18 wt %, preferably 10-15 wt %, relative to the total weight of the concrete.

In one embodiment, each of the first planar concrete block 104 and the second planar concrete block 106 has a thickness ranging from 20 to 100 mm, preferably 40 to 90 mm, preferably 60 to 80 mm, preferably about 70 mm. A width and a length of the insulating layer 112 may vary depending on the geometries of the panel frame 102. In a preferred embodiment, the width of the first planar concrete block 104 is substantially the same the width of the second planar concrete block 106, wherein the width ranges from about 30 cm to 5 m, preferably 50 cm to 4 m, preferably 1-3 m, preferably 1.5-2 m. An aspect ratio (i.e. a ratio of length to width) of each of the first and the second planar concrete blocks may range from 50:1 to 1:20, preferably 10:1 to 1:5, preferably 5:1 to 1:2, preferably 4:1 to 1:1.

The panel frame 102 further includes a first spacer 108 and a second spacer 110. In a preferred embodiment, the shape and the composition of the first spacer 108 and the second spacer 110 are substantially the same, wherein each may preferably be a rectangular block, preferably with a square cross-section. In another embodiment, the composition of the first spacer 108, the second spacer 110, the first planar concrete block 104, and the second planar concrete block 106 are substantially the same.

Figure 3:
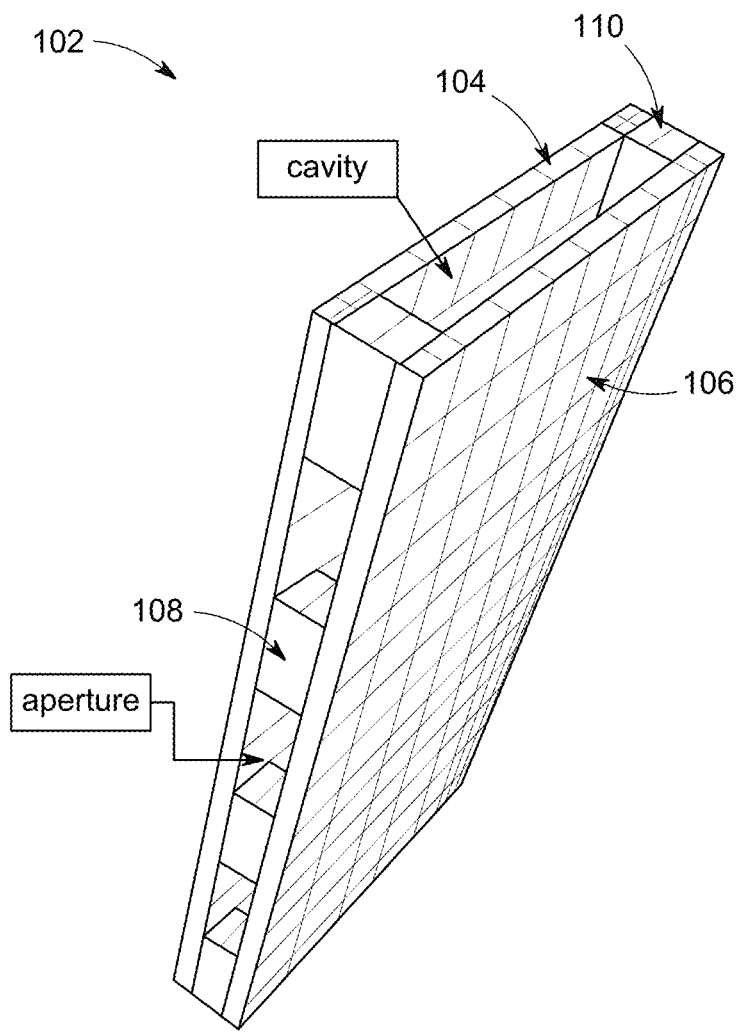
FIG. 3 illustrates a panel frame of the composite wall panel.

The first spacer 108 and the second spacer 110 are oriented axially with a long dimension (or length; in embodiments where the composite wall panel is laid vertically the long dimension may refer to the height) of the first and the second planar concrete blocks and between the first and the second planar concrete blocks to form a cavity in the panel frame. For example, in a preferred embodiment, the first and the second planar concrete blocks are rectangular blocks and the first spacer 108 and the second spacer 110 are vertically oriented between the first planar concrete block 104 and the second planar concrete block 106, thereby forming a cavity in the panel frame 102, as shown in FIG. 3. A thickness of the first spacer 108 and the second spacer 110 are substantially the same as that of the insulating layer 112, as shown in FIG. 1B. In view of that, the insulating layer is in a direct contact with the first planar concrete block 104 and the second planar concrete block 106, and therefore is sandwiched therebetween, as shown in FIGS. 1B-1E. In a preferred embodiment, the insulating layer 112 forms strong bonds with the first planar concrete block 104 and the second planar concrete block 106.

Figure 4:
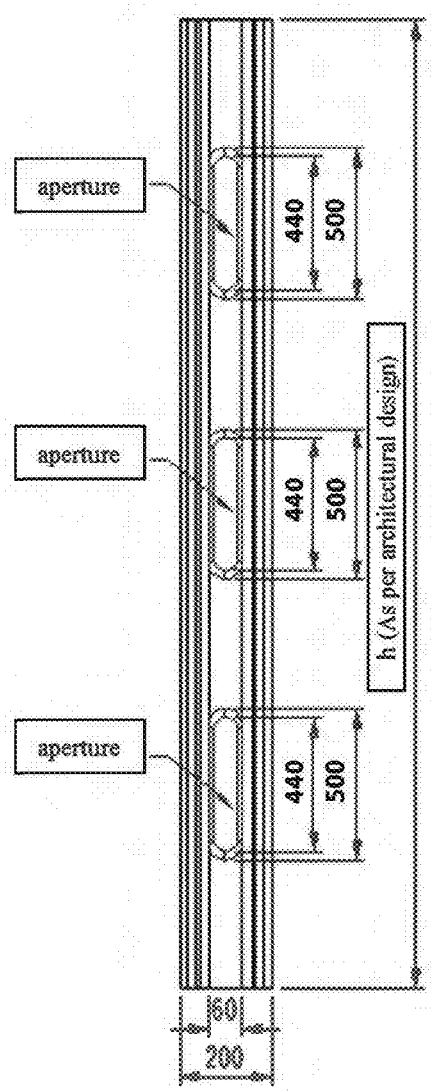
FIG. 4 illustrates a side-view of the panel frame.

Preferably, at least one aperture (opening) may be present in the first and/or the second spacer. In a preferred embodiment, at least one aperture is present in the first spacer 108 and at least one aperture is present in the second spacer 110. Accordingly, lateral sides of the panel frame 102 have at least one aperture, as shown in FIG. 3. Number of apertures present in the first spacer 108 and/or the second spacer 110 may vary depending on the application of the composite wall panel. For example, in certain embodiments, 1-8, or 2-6, or 3-5 apertures may be present in the first and/or the second spacer. The apertures may preferably be rectangular, as shown in FIG. 3. Alternatively, the aperture may have other geometries including, but not limited to rounded, circular, or hexagonal, or triangular, or elliptical, etc. FIG. 4 is a side-view of the panel frame that has three apertures on a lateral side.

In certain embodiments, a plurality of spacers with smaller lengths than the length of the composite wall panel may be secured between the first and the second planar concrete blocks. In view of that, rectangular apertures with varying lengths may be formed on lateral sides of the composite wall panel, simply by varying the number and the length of the spacers.

Figure 1B:
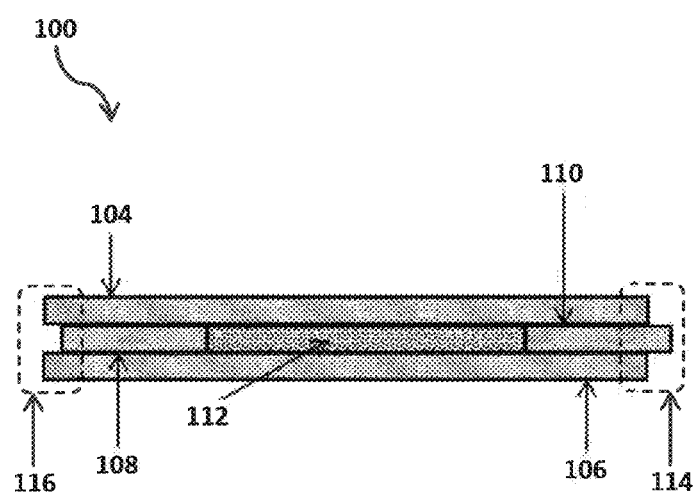
FIG. 1B illustrates a cross-sectional view of the composite wall panel of FIG. 1A at section A-A.
Figure 1C:
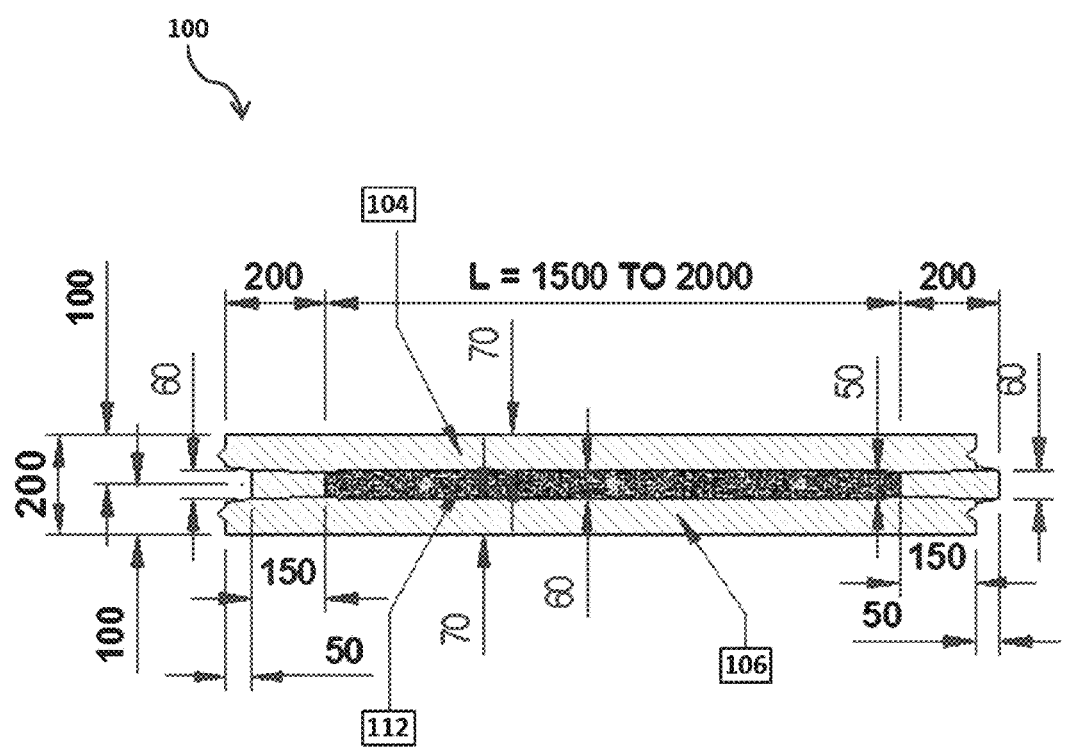
FIG. 1C illustrates a cross-sectional view of the composite wall panel of FIG. 1A at section A-A with dimensions.
Figure 1D:
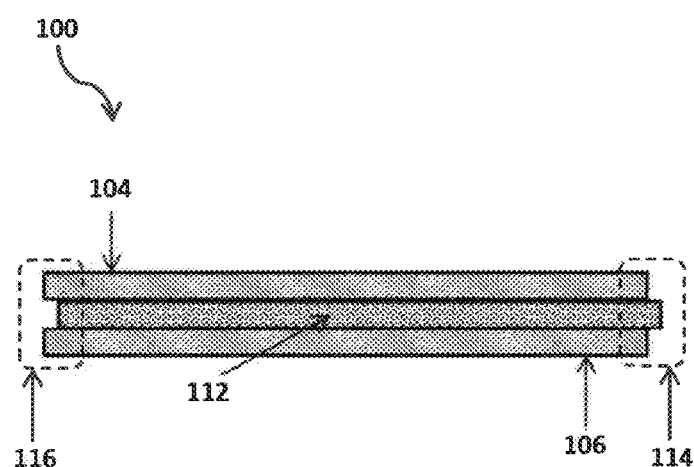
FIG. 1D illustrates a cross-sectional view of the composite wall panel of FIG. 1A at section B-B.
Figure 1E:
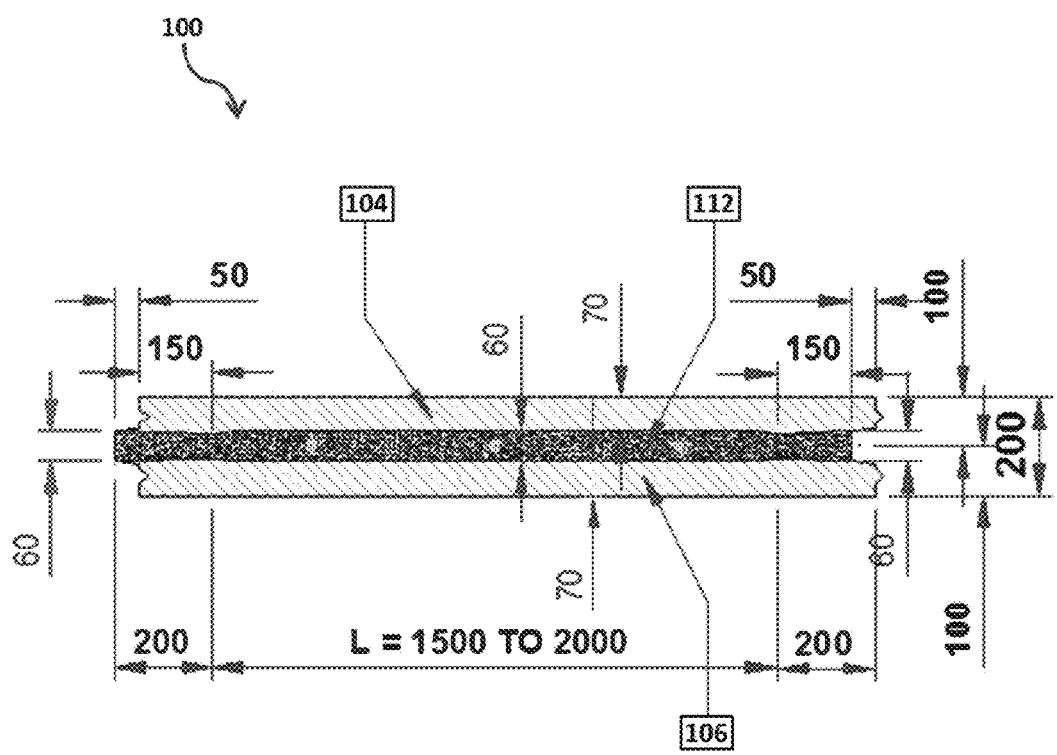
FIG. 1E illustrates a cross-sectional view of the composite wall panel of FIG. 1A at section B-B with dimensions.

In some preferred embodiments, the first spacer 108 and the second spacer 110 are vertically secured between the first planar concrete block 104 and the second planar concrete block 106 such that a tongue-groove structure (with a tongue 114 and a groove 116) is formed in the composite wall panel 100, as shown in FIGS. 1B and 1D. The "tongue-groove structure" refers to an indentation-protrusion assembly which permits mating and matching of neighboring panels during construction. The tongue-groove structure may preferably be useful for vertically joining the composite wall panels side-by-side. A length of the tongue 114, i.e. a male part, may vary in the range from 10-80 mm, preferably 20-70 mm, preferably 30-60 mm, preferably about 50 mm. Preferably, a length of the groove 116, i.e. a female part, is substantially the same as the tongue 114, as shown in FIGS. 1B and 1D.

In a preferred embodiment, the composite wall panel 100 has a thermal conductivity of 0.3-0.35 W/(m·K), preferably 0.31-0.33 W/(m·K) as determined by ASTM C 177. As used herein, thermal conductivity is a property of a material to conduct heat or alternatively the ability of a material to absorb heat. It can also be defined as the quantity of heat transmitted through a unit thickness of a material due to a unit temperature or the ratio between the heat flux and the temperature gradient. The SI units for thermal conductivity is measured in watts per meter kelvin W/(m·K). Conventional concrete panels have a thermal conductivity of about 1.0 W/m·K, and therefore the composite wall panels of the present disclosure have a substantially lower thermal conductivity (i.e. about 60-70% lower), which may provide energy conservation in buildings employing the composite wall panels. In certain embodiments where perlite or expanded perlite is used in the composition of the first and the second planar concrete blocks, the thermal conductivity may even further reduced to a value in the range of 0.2-0.3 W/(m·K), preferably 0.24-0.28 W/(m·K), preferably 0.25-0.27 W/(m·K), which is about 60-70% lower than the thermal conductivity of conventional panels.

In one embodiment, the composite wall panel 100 has a compressive strength in the range of 35-45 MPa, or 36-43 MPa, preferably 37-41 MPa after setting for up to 30 days, preferably up to 28 days, preferably up to 14 days, preferably up to 7 days. As used herein, compressive strength is the capacity of a material or structure to withstand compressive loads, as opposed to tensile strength, which is the capacity of a material to withstand tensile loads. In one embodiment, the compressive strength of the composite wall panels is determined by ASTM C 150. In certain embodiments where perlite or expanded perlite is used in the composition of the first and the second planar concrete blocks, the compressive strength of the composite wall panels may be reduced by no more than 10%, preferably 4-8% relative to the compressive strength of the composite wall panels where perlite or expanded perlite is not used in the composition of the first and the second planar concrete blocks. In view of the abovementioned compressive strengths, the composite wall panel 100 can be safely employed in building structures, even in windy climates, whereas considered a lightweight concrete structure in view of the definition of "lightweight concrete structure" as defined in ACI 318 [ACI 318 (2014), Building Code Requirement for Structural Concrete, American Concrete Institute].

In one embodiment, the composite wall panel 100 has a unit weight of 1700-1900 kg/m$^3$, preferably 1750-1850 kg/m$^3$, preferably about 1800 kg/m$^3$. As used in this disclosure, unit weight (or specific weight) is the weight per unit volume of a material. The unit weight of the composite wall panel of the present disclosure may vary depending on the weight percent of the aggregates present in the insulating layer, and the first and the second planar concrete blocks. Conventional composite wall panels have a unit weight of around 2200-2500 kg/m$^3$, therefore, the composite wall panel of the present disclosure may have a unit weight (in kg/m$^3$) that is 10-20% lower than that of conventional concrete blocks, which can cause less weight to be placed on a building frame and less wear on any concrete handling machinery.

In certain embodiments where perlite or expanded perlite is used in the composition of the first planar concrete block 104 and the second planar concrete block 106, the unit weight may even further reduced to a value in the range of 1300-1600 kg/m$^3$, preferably 1350-1550 kg/m$^3$, which is about 30-50% lower than the unit weight of conventional panels. Composite wall panels may be made by selectively sequentially pouring different components into a concrete mixer to form the concrete mixture, and then pouring the concrete mixture into the cavity of the panel frame 102. Accordingly, in one embodiment, the cement and the fine aggregate, e.g. sand, are dry-mixed in a concrete drum mixer, e.g. a Hobart mixer, for a time period in the range of 30 seconds-10 minutes, 45 seconds-8 minutes, or 50 seconds-5 minutes. Mixing the cement and fine aggregates forms a mixture in which the cement is homogenously dispersed. Following the dry mixing process, water is added to the mixture of cement and aggregate. The water is slowly poured into a mixer while the mixer turns the cement and aggregates for a time period in the range of 1-10 minutes, 2-8 minutes, or 3-6 minutes. Preferably the water is mixed into the mixture for a time period of 3 minutes. After a thorough mixing, the expanded polystyrene beads are added and mixing continued for a time period in the range of 1-10 minutes, 2-8 minutes, or 3-6 minutes, preferably about 3 minutes. Following mixing the expanded polystyrene beads, the foaming agent and the superplasticizer are slowly poured into a mixer, and the concrete mixture is further mixed for a time period in the range of 1-10 minutes, 2-8 minutes, or 3-6 minutes, or until the aggregates and the expanded polystyrene beads are well-dispersed in the concrete mixture. The concrete mixture containing the water, the expanded polystyrene beads, the cement, the aggregates, the foaming agent, and the superplasticizer is then fed into the cavity of the panel frame 102 to form the insulating layer 112 between the first and the second concrete planar blocks. Once poured, the concrete mixture may be compacted in the panel frame by using a steel rod or trowel. The composite wall panel may be cured for a time period of 5-30 days, preferably 14-28 days, more preferably 28 days at a temperature in the range of 20-30° C., 21-29° C. or 22-28° C. Processing steps of forming a rectangular block of the insulating layer is depicted in FIGS. 8-16.

Such composite wall panels are substantially economically advantaged in comparison to conventional concrete wall panels which contain substantially greater amounts of cement, such as Portland cement, which must be obtained as a purchased material. In addition, the composite wall panels have substantially lower unit weights and lower thermal conductivities and comparable compressive strengths when compared to conventional concrete wall panels.

Figure 20:
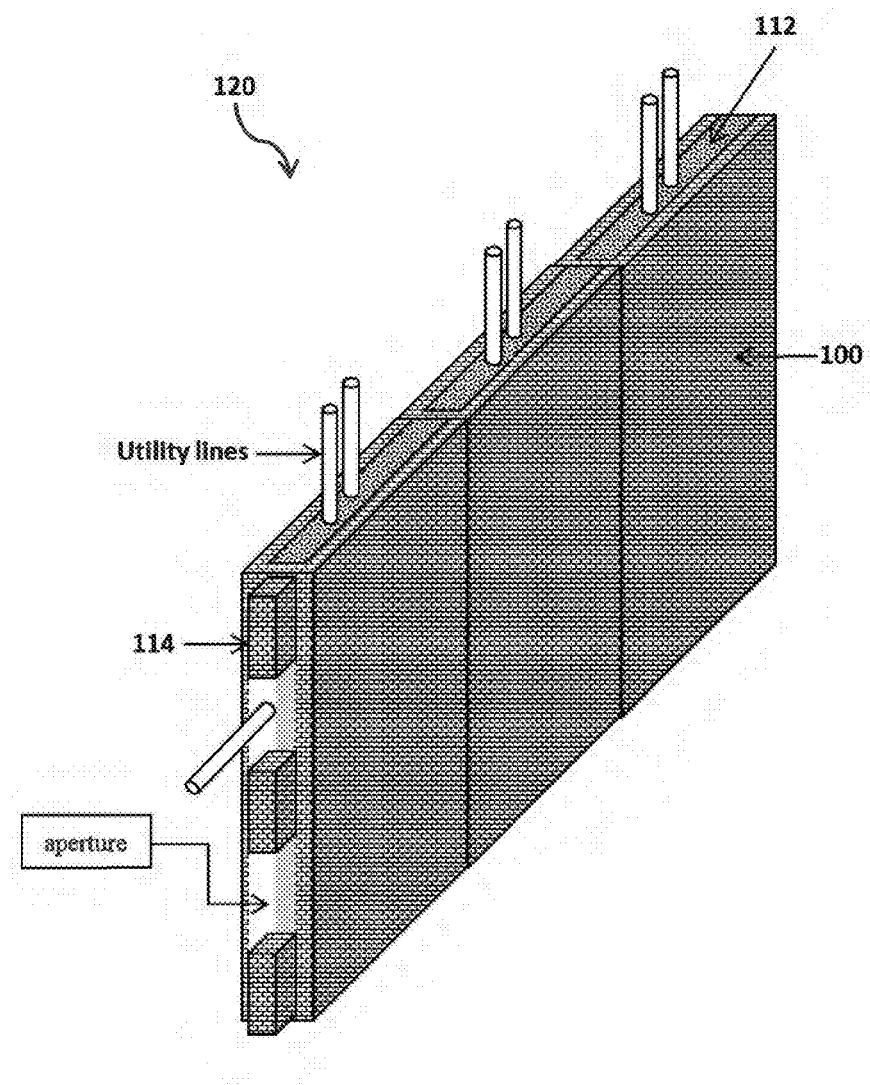
FIG. 20 illustrates a wall assembly that comprises a plurality of the composite wall panels that are vertically joined to one another, wherein utility lines are embedded in the insulating layer.

Referring now to FIG. 20, according to a second aspect, the present disclosure relates to a wall assembly 120, comprising a plurality of the composite wall panels 100 that are vertically jointed to one another via the tongue-groove structures.

The plurality of the composite wall panels may preferably be secured to one another such that apertures present in the first spacer directly faces the apertures of the second spacer, thereby forming a pathway for utility lines. In view of that, in some preferred embodiments, one or more utility lines may be embedded in the pathway and substantially surrounded by the insulating layer. The utility lines may be pipelines for water, wastewater, or ducts for wires, etc. Preferably the utility lines are pipelines for carrying hot water. Empty spaces (gaps) may preferably not be present in the cavity of the composite wall panels. In certain embodiments, an average size of the gaps, when present in the cavity of the composite wall panels is no more than 5 mm, preferably no more than 2 mm, preferably no more than 1 mm, preferably no more than 0.5 mm.

The wall assembly may preferably be built on site. Accordingly, in a first step, the panel frames of the wall assembly are jointed together on a concrete foundation. In a second step, the utility lines are embedded in the cavity of the panel frames. Then, the concrete mixture is poured into the cavity of the panel frames to form the wall assembly 120 once the insulating layer is hardened in the cavity of the panel frames.

The examples below are intended to further illustrate protocols for the composite wall panel and the wall assembly, and are not intended to limit the scope of the claims.

Example 1—Description of the Structural Walls

Figure 5:
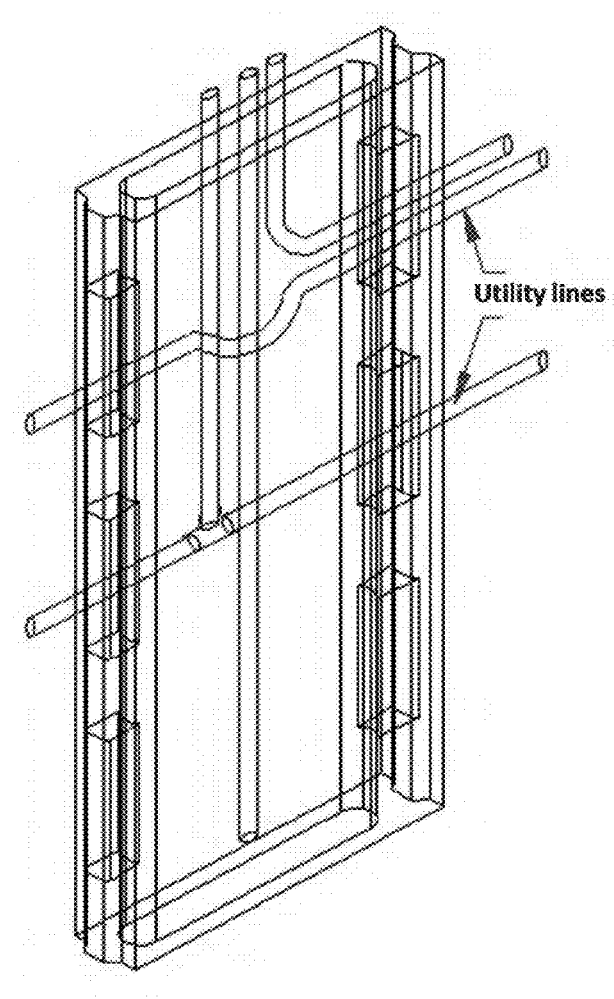
FIG. 5 illustrates a panel frame and utility lines that are disposed therein.
Figure 6:
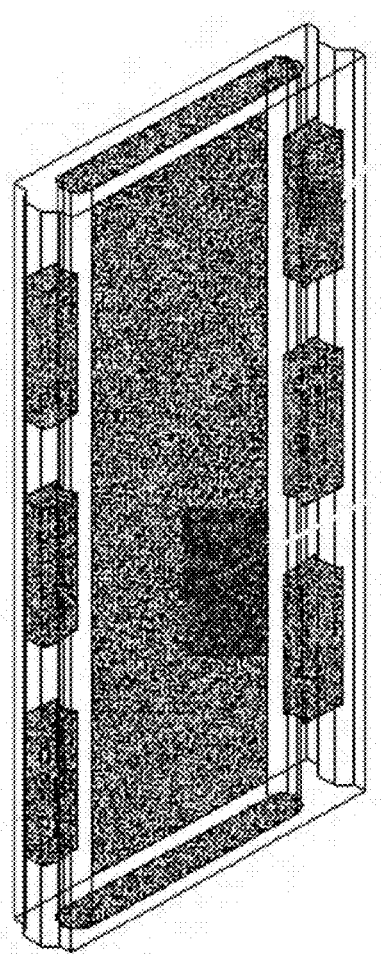
FIG. 6 illustrates an isometric view of the composite wall panel with an insulating layer.
Figure 7:
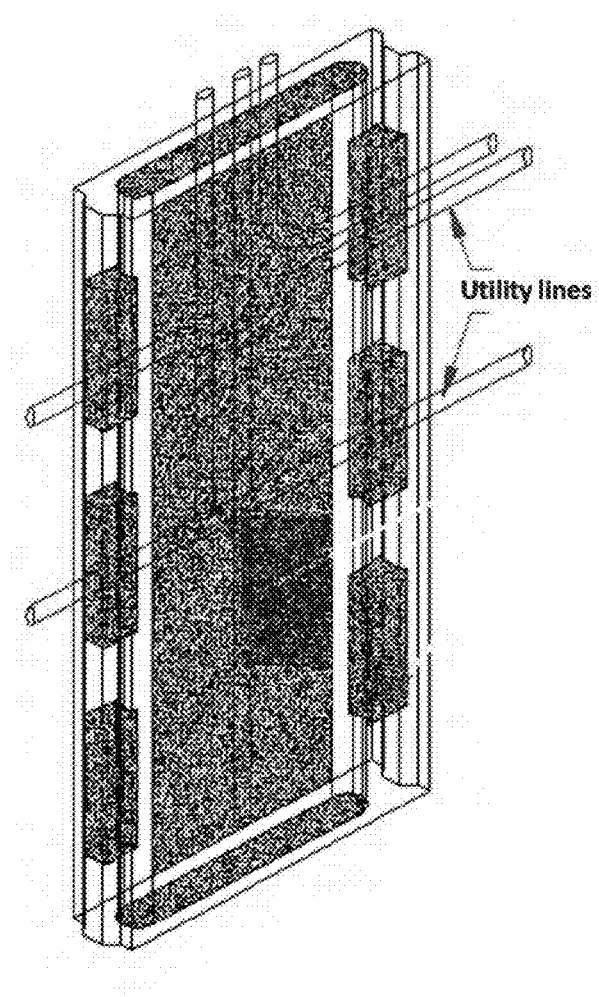
FIG. 7 illustrates the composite wall panel with the insulating layer, wherein utility lines that are embedded therein.

FIG. 1A shows the isometric view of the proposed composite structural wall panel. The load bearing wall panel comprises of 70 mm thick dual parallel solid elements separated by a 60 mm wide cavity. The overall thickness of the panel is 200 mm. The thickness of the wall can be varied, depending on the structural design. FIGS. 1B-1E show cross-sectional views of the panel at the solid part and along the opening. Layers of the composite panel are illustrated in FIG. 2. The panel has three openings uniformly distributed along the height on the either side of it as shown in the side elevation in the FIG. 4. Further, these panels have interlocking system to connect vertical joints when placed side by side on both ends. Also these walls can be prefabricated with the vertical reinforcement projecting upwards at each level of the structure to connect two walls one upon the other. The width of the panels can range between 1500 mm to 2000 mm with a height depending on architectural requirements. The 60 mm wide cavity between the solid elements is filled with a highly insulated lightweight foam-EPS mortar. The mix design of the foam-EPS mortar is presented in the subsequent section. As the panel has 60 mm wide cavity it is easy to run utilities through it as shown in FIG. 5. FIGS. 6 and 7 shows the panel filled with the foam-EPS mortar without and with the utilities, respectively, demonstrating that the insulating material can easily surround the utilities making the panel thermally resistant.

Example 2—Preparation of the Specimens

Mix Constituents of the Insulating Layer

Figure 8:
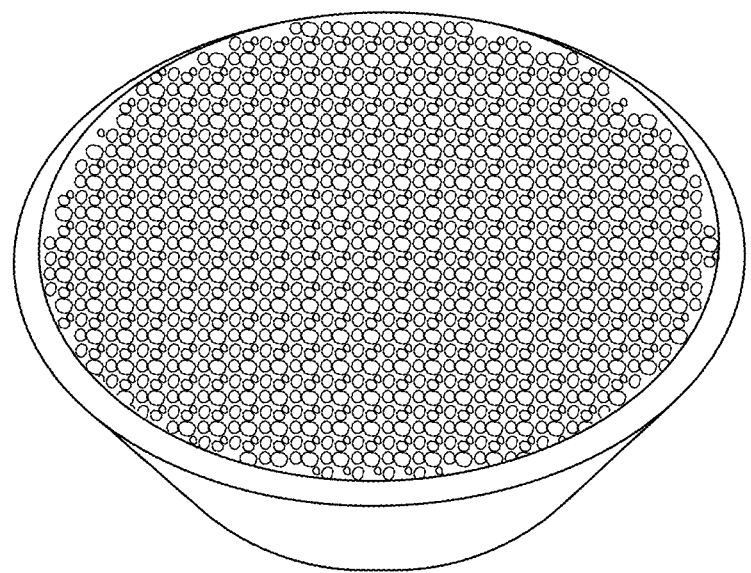
FIG. 8 is an image of expanded polystyrene beads that are used in the composition of the insulating layer.
Figure 9:
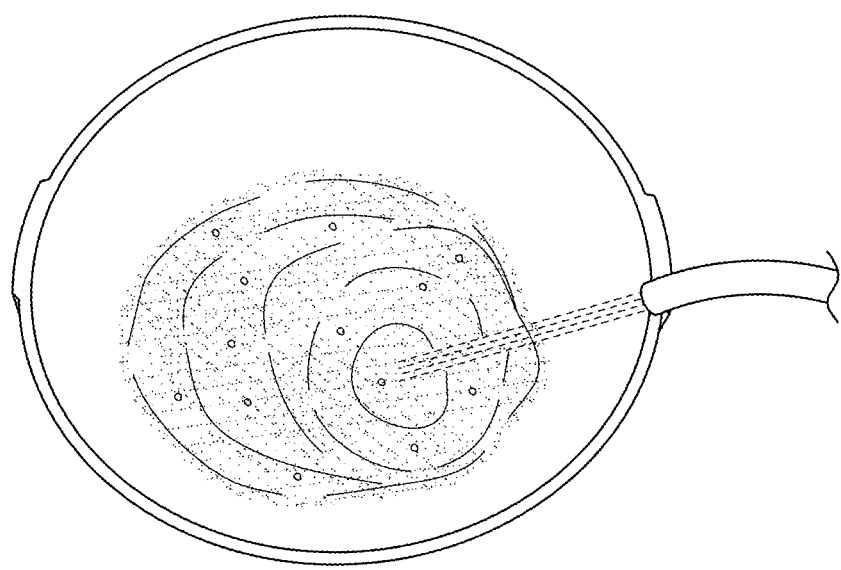
FIG. 9 is an image of a foaming agent that is used in composition of the insulating layer.

In this disclosure, a lightweight foam mortar has constituents that includes, cement, sand, expanded polystyrene (EPS) beads, foam and water. FIGS. 8 and 9 show the expanded polystyrene beads and generated foam solution, respectively. This lightweight foam-EPS mortar was used as insulating layer of thickness 60 mm for the proposed structural wall system. In order to achieve a preferred composition, quantities of constituent materials including, EPS granules, foam liquid, cement, sand and water were varied. Unit weight and thermal performance of the mixture was considered in each composition. Several trials were conducted before a preferred mixture is selected. In case of mortars, the thermal conductivity of the material is proportional to the unit weight. The objective of this study was to find a composition that gives a lightweight wall panel, i.e. a small unit weight. The amount of mortar needed for binding the EPS granules and quantity of foam was also very important in selecting the mixture design apart from the setting time of mortar. The details of the trial mixtures conducted are listed in Tables 1-7.

TABLE 1

Composition of lightweight foam-EPS mortar in the first trial.

| Constituent | Weight, % | Unit Weight, kg/m$^3$ |
|---|---|---|
| Cement | 47.50 | 549 |
| Sand | 31.66 | |
| Expanded Polystyrene Beads (EPS) | 2.20 | |
| Foam | 4.39 | |
| Water | 14.25 | |

TABLE 2

Composition of lightweight foam-EPS mortar in the second trial.

| Constituent | Weight, % | Unit Weight, kg/m$^3$ |
|---|---|---|
| Cement | 47.00 | 556 |
| Sand | 31.33 | |
| Expanded Polystyrene Beads (EPS) | 2.35 | |
| Foam | 5.22 | |
| Water | 14.10 | |

TABLE 3

Composition of lightweight foam-EPS mortar in the third trial.

| Constituent | Weight, % | Unit Weight, kg/m$^3$ |
|---|---|---|
| Cement | 46.70 | 585 |
| Sand | 31.12 | |
| Expanded Polystyrene Beads (EPS) | 1.95 | |
| Foam | 4.66 | |
| Water | 15.57 | |

TABLE 4

Composition of lightweight foam-EPS mortar in the fourth trial.

| Constituent | Weight, % | Unit Weight, kg/m³ |
|---|---|---|
| Cement | 45.18 | 590 |
| Sand | 30.12 | |
| Expanded Polystyrene Beads (EPS) | 2.11 | |
| Foam | 4.52 | |
| Water | 18.07 | |

TABLE 5

Composition of lightweight foam-EPS mortar in the fifth trial.

| Constituent | Weight, % | Unit Weight, kg/m³ |
|---|---|---|
| Cement | 48.31 | 580 |
| Sand | 32.21 | |
| Expanded Polystyrene Beads (EPS) | 1.13 | |
| Foam | 2.25 | |
| Water | 16.10 | |

TABLE 6

Composition of lightweight foam-EPS mortar in the sixth trial.

| Constituent | Weight, % | Unit Weight, kg/m³ |
|---|---|---|
| Cement | 48.78 | 550 |
| Sand | 32.52 | |
| Expanded Polystyrene Beads (EPS) | 1.14 | |
| Foam | 1.30 | |
| Water | 16.26 | |

TABLE 7

Composition of lightweight foam-EPS mortar in the seventh trial.

| Constituent | Weight, % | Unit Weight, kg/m³ |
|---|---|---|
| Cement | 49.5 | 350 |
| Sand | 33.0 | |
| Expanded Polystyrene Beads (EPS) | 1.0 | |
| Foam | 1.65 | |
| Water | 14.55 | |
| Superplasticizer | 0.30 | |

The composition as shown in Table 7 was selected as the preferred composition, due to a substantially reduced unit weight when compared to the same in other trials.

Mix Constituents of the Concrete Blocks

Table 8 shows the mix constituents of the two concrete layers on either side of insulating material. The normal weight concrete was used in these layers. Separately, lightweight aggregate concrete was also used to fabricate these two layers which resulted in a reduced the unit volume weight of the proposed composite wall panel without affecting the thermal performance of the panel.

TABLE 8

Constituent materials for the two concrete layers.

| Mix | Water to Cement | OPC kg/m³ | Coarse Agg. kg/m³ | Fine Agg. kg/m³ |
|---|---|---|---|---|
| M1 | 0.4 | 370 | 1230 | 660 |

Figure 10:
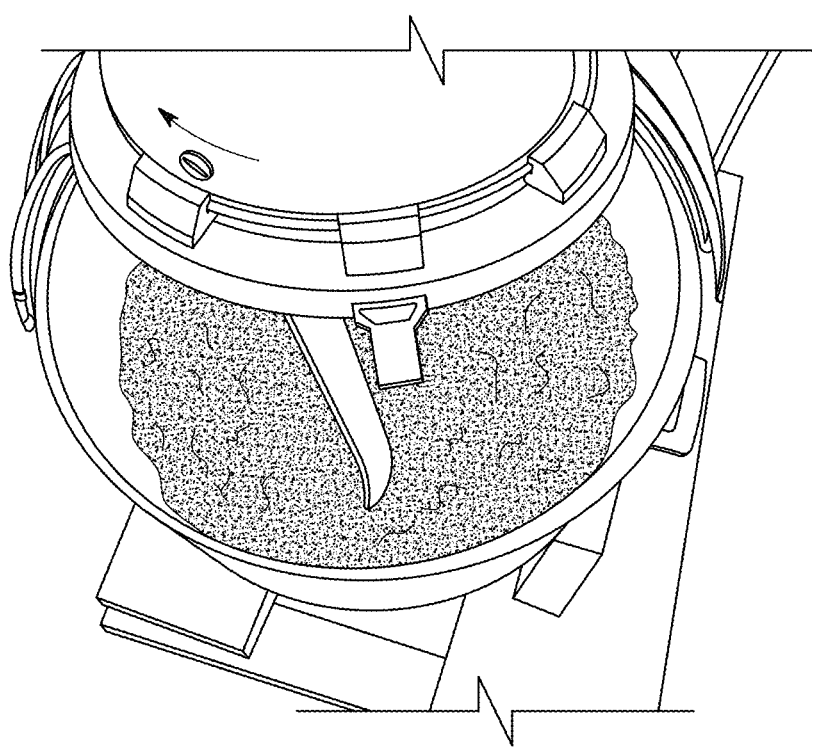
FIG. 10 is an image of dry-mixing cement and aggregates.
Figure 11:
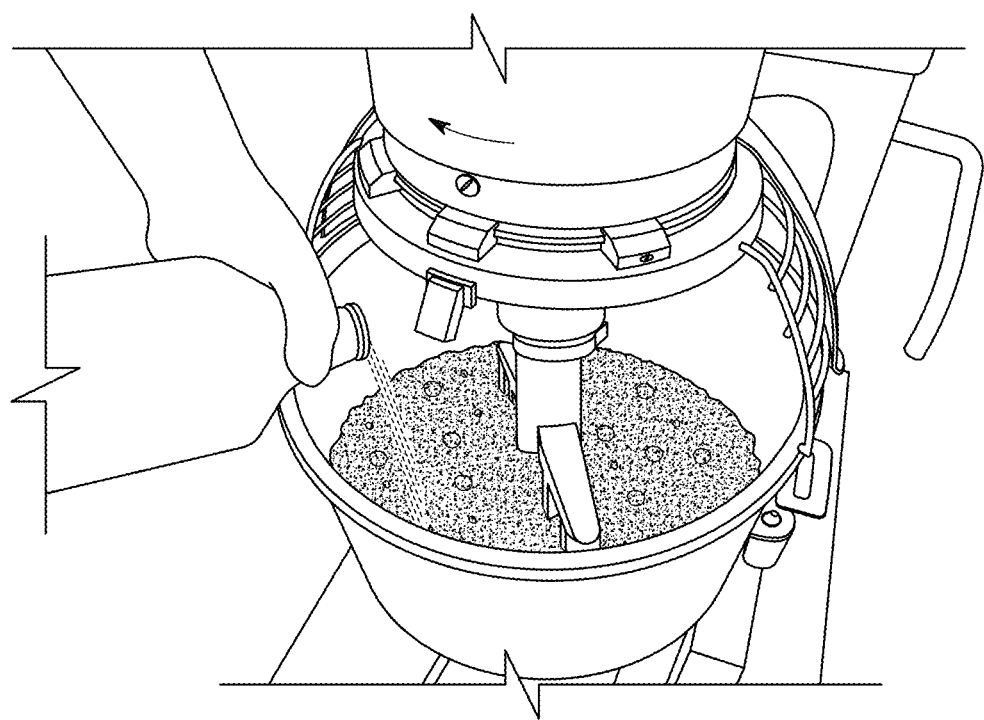
FIG. 11 is an image of wet-mixing cement and aggregates.
Figure 12:
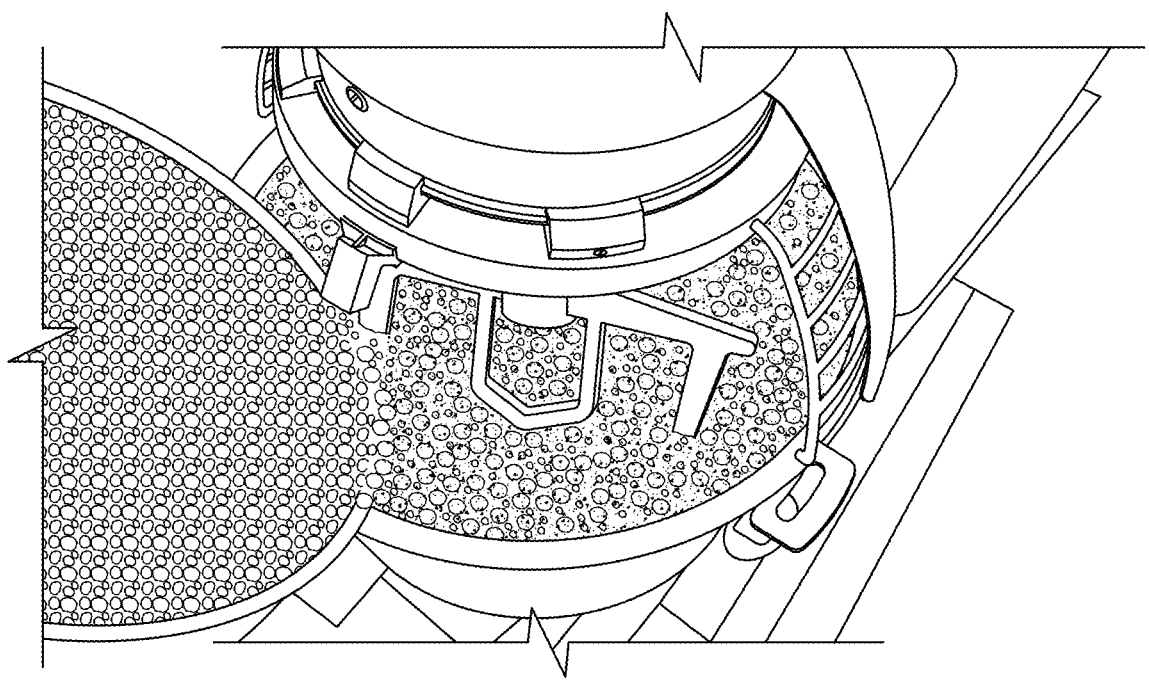
FIG. 12 is an image of adding the expanded polystyrene beads to the cement and the aggregates.
Figure 13:
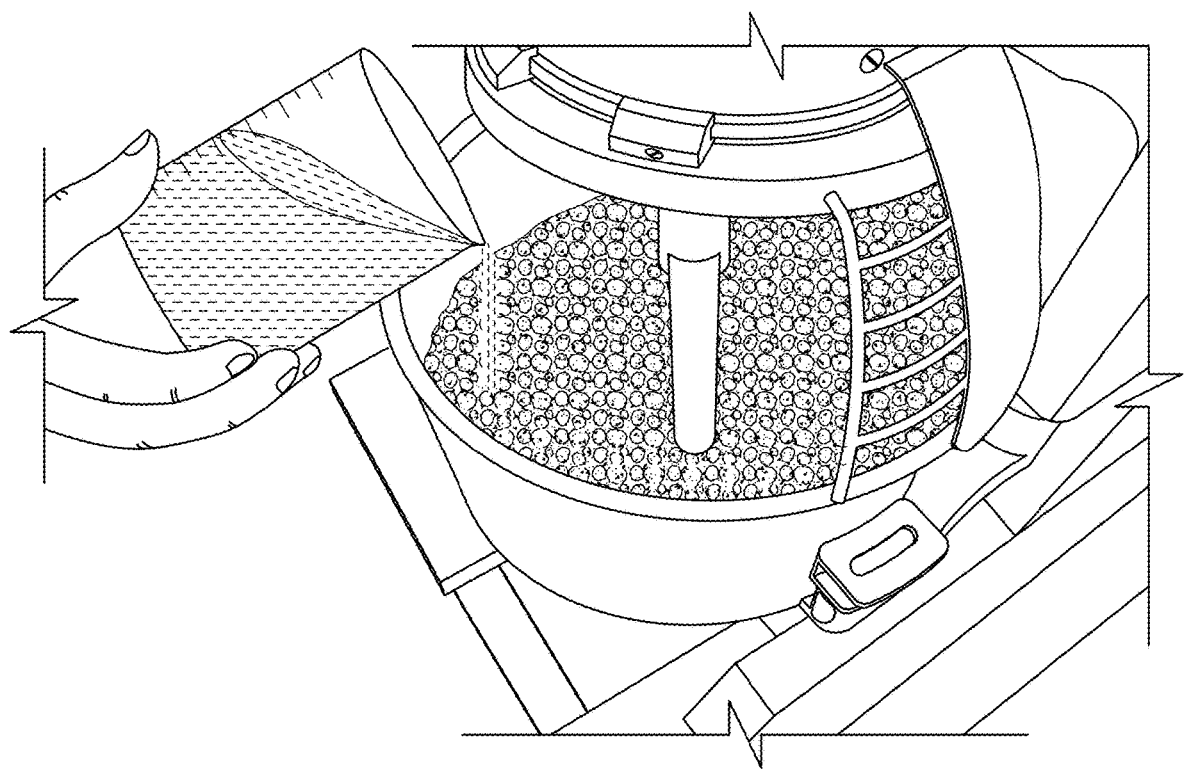
FIG. 13 is an image of adding the foaming agent to the cement, the aggregates, and the expanded polystyrene beads.
Figure 14:
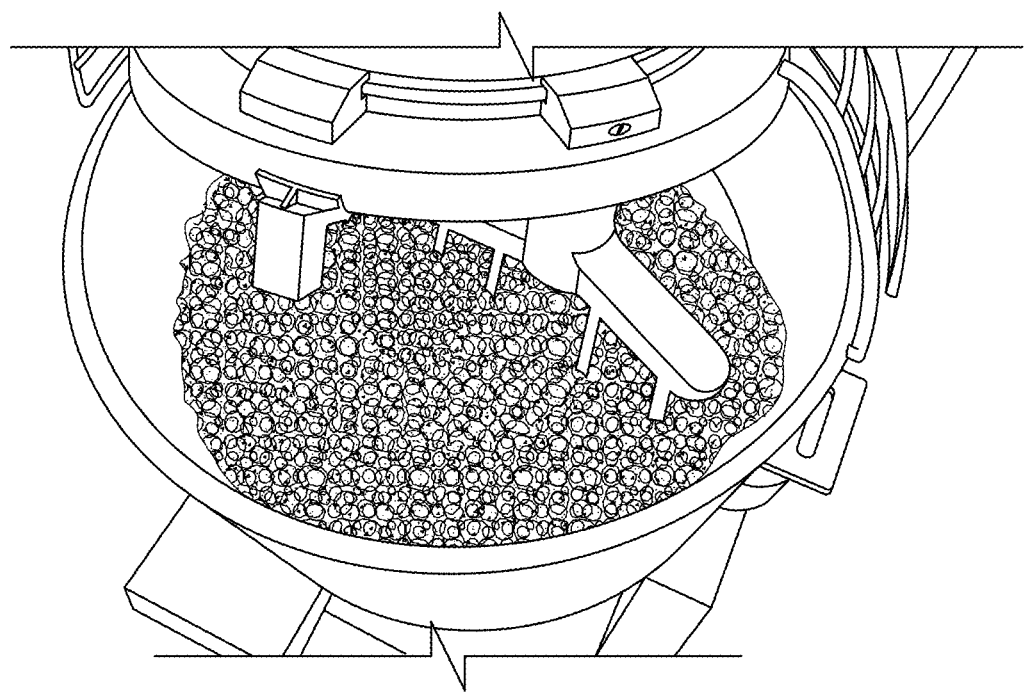
FIG. 14 is an image of a concrete mixture during mixing.
Figure 15:
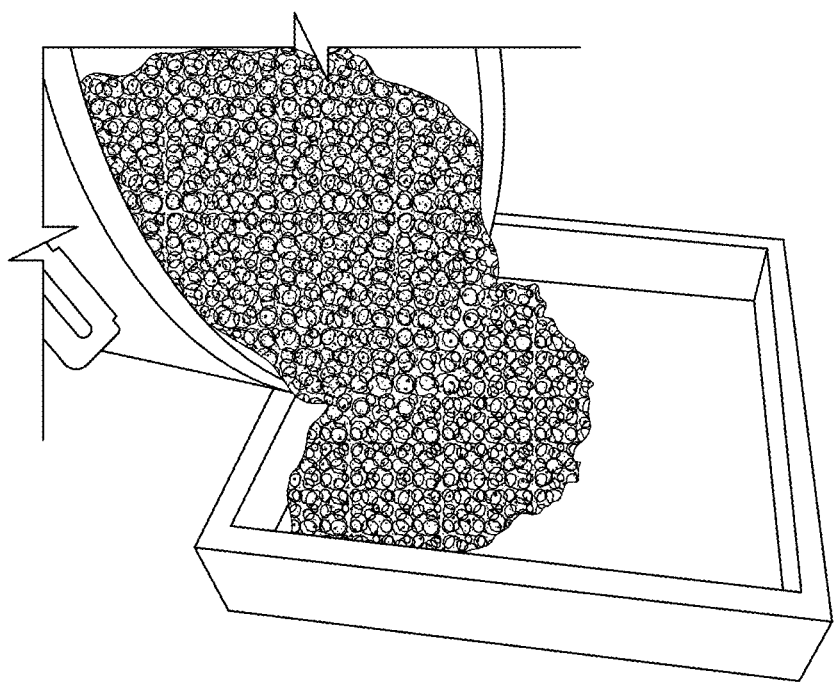
FIG. 15 is an image of pouring the concrete mixture into a mold.
Figure 16:
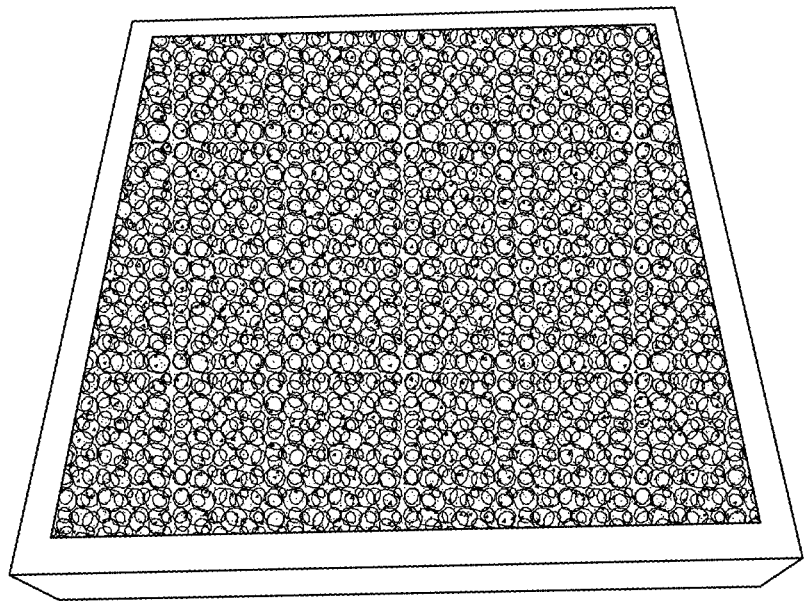
FIG. 16 is an image of the concrete mixture in the mold after being troweled.

For preparing foam-EPS mortar specimens for thermal conductivity testing, the desired quantities of cement and sand were measured and placed in an approximately 10.0 L capacity Hobart mixer and thoroughly mixed prior to the addition of water as shown in FIG. 10. Wet mixing followed by the addition of measured water pre-mixed with the high range water reducer. FIG. 11 shows the wet mixing. After thoroughly mixing the constituents for three minutes, expanded polystyrene beads were added and mixed for another three minutes as shown in FIG. 12. As a next step, a foam cement (or foam) was added to the mixture, as shown in FIG. 13. The mixing of constituent materials is continued until the mixture become homogenous. FIG. 14 demonstrates the homogenous foam-EPS mortar mixture. Subsequently, as illustrated in the FIG. 15, the foam-EPS mortar was placed in the molds and surface was carefully finished to have moderately smooth finish. FIG. 16 shows the specimen after the surface has trowel finished. After placement and finishing of mortar, the specimens were covered with a plastic sheet to prevent moisture loss. After 24 hours of casting, specimens were de-molded and conditioned in the oven for further thermal evaluation.

Example 3—Characterization of the Specimens

Thermal Performance

The thermal conductivity was measured under steady-state conditions using a guarded hot plate that conforms to the ASTM Standard C-177. Panel samples of dimensions 35 cm×35 cm×6 cm and 7 cm (thickness) were prepared, dried in an oven, and tested for thermal conductivity on the guarded hot plate. Due to the thickness limitations for testing of the samples on the guarded hot plate, individual layers of the composite wall panel were tested separately and the thermal performance parameters were calculated for the composite wall panel. The Dynatech guarded hot plate thermal conductance measuring system, TCFG-R4-6, was used to determine the thermal conductivity. The types of the tested wall sample layers are shown in FIG. 2. The accuracy of the testing machine is about ±4% of the true value of the thermal conductivity. During the tests, the average temperature of the samples was kept at about 34.0±1.5° C. The thermal conductivity test results are reported in Table 9 for the individual layers of the concrete panel (see FIG. 2).

TABLE 9

Thermal conductivity test results of the individual layer samples of the composite wall panel.

| S. No. | Panel Type | Dimensions cm | Test Thickness cm | Mean Temp. ° C. | Thermal Conductivity W/m · K |
|---|---|---|---|---|---|
| 1. | Solid Concrete Panel | 35 × 35 × 7 | 7.07 | 33.2 | 1.138 |
| 2. | Foam-EPS Mortar Panel | 35 × 35 × 6 | 6.46 | 35.1 | 0.121 |

The equivalent thermal conductivity and thermal resistance/conductance (surface to surface) were calculated for the composite wall panel of 200 mm thickness with sandwiched 60 mm foam-EPS mortar panel between the two individual layers of 70 mm solid concrete panels. The calculated thermal performance parameters for the composite wall panel are reported in Table 10 below.

TABLE 10

Thermal performance parameters for the composite wall panel with outer layers of normal weight concrete.

| Panel Type[1] | Thickness mm | Equivalent Thermal Conductivity W/m · K | Thermal Resistance[3] m² · K/W | Thermal Conductance[3], W/m² · K |
|---|---|---|---|---|
| Composite Wall Panel[2] | 200 | 0.323 | 0.619 | 1.615 |

[1]Due to the limitations of the guarded hot plate individual layers of composite wall were tested separately and the values are calculated for the composite wall panel.
[2]Panel layers consist of 70 mm Solid Concrete + 60 mm Foam-EPS Mortar + 70 mm Solid Concrete.
[3]The reported values, based on the thickness of the composite wall panel, are for surface to surface of the wall panel.

Thermal resistance of 10% and 15% lightweight perlite aggregate concrete of 200 mm thickness was reported as 0.347 and 0.426, respectively [Ibrahim, M. S. Barry, L. M. Alhems, A. Ahmad, M. K. Rahman, Development of durable structural lightweight concrete, Filed patent application, 2016, incorporated herein by reference in its entirety].

After replacing the normal weight concrete with the lightweight perlite aggregate concrete in the outer layers of the composite wall panel, the thermal conductance was reduced further.

The calculated thermal performance parameters of the composite wall panel with 10% and 15% lightweight perlite aggregate concrete are reported in Table 11. As can be observed from the thermal performance data of Tables 10 and 11, the use of 10% and 15% lightweight perlite aggregate concrete reduced the thermal conductance of the wall panels by about 16.1% and 22.0%, respectively, relative to the composite wall panel that uses normal weight concrete in the outer layers.

TABLE 11

Thermal performance parameters for the composite wall panel with outer layers of lightweight perlite aggregate concrete.

| Panel Type | Thickness mm | Equivalent Thermal Conductivity W/m · K | Thermal Resistance[3] m² · K/W | Thermal Conductance[2], W/m² · K |
|---|---|---|---|---|
| Composite Wall Panel with 10% Lightweight Perlite Aggregate Concrete[1] | 200 | 0.271 | 0.738 | 1.355 |
| Composite Wall Panel with 15% Lightweight Perlite Aggregate Concrete[1] | 200 | 0.252 | 0.794 | 1.260 |

[1]Panel layers consist of 70 mm Lightweight Perlite Aggregate Concrete + 60 mm Foam-EPS Mortar + 70 mm Lightweight Perlite Aggregate Concrete.
[2]The reported values, based on the thickness of the composite wall panel, are for surface to surface of the wall panel.

Compressive Strength and Unit Weight

Compressive strength of 100 mm concrete cube specimens was determined according to ASTM C 150 using a digital compression testing machine MATEST C55. The compressive strength of specimens was determined after 7, 14 and 28 days of water curing. Triplicate specimens were tested and the average values are reported.

In addition, Tables 12 and 13 show the unit weight of insulating layer and normal weight concrete, respectively. The average unit weight of insulating layer was about 516 kg/m. Average unit weight of the concrete used in the outer layers of the wall panel was about 2361 kg/m³. The composite wall system has a unit volume weight of 1807 kg/m³, about 25% lesser than the normal weight concrete. Therefore, the composite wall system was classified as lightweight according to ACI 318 [ACI 318 (2014) Building Code Requirement for Structural Concrete, American Concrete Institute].

TABLE 12

Unit weight of insulating layer.

| Sample# | Panel Type | Dimensions cm | Weight gr | Unit Weight, kg/m³ | Average Unit Weight kg/m³ |
|---|---|---|---|---|---|
| 1 | Insulating Panel | 35 × 35 × 6 | 3703 | 503.80 | 516.32 |
| 2 | | 35 × 35 × 6 | 3679 | 500.54 | |
| 3 | | 35 × 35 × 6 | 4003 | 544.62 | |

TABLE 13

Unit weight of concrete.

| Sample # | Curing Period, days | Length, cm | Width, cm | Depth, cm | Weight, gr | Unit wt., kg/m³ | Avg. Unit wt., kg/m³ |
|---|---|---|---|---|---|---|---|
| 1 | 7 | 10.04 | 10.04 | 10.02 | 2419.71 | 2395.67 | 2361 |
| 2 | | 10.04 | 10.08 | 10.02 | 2420.68 | 2387.12 | |
| 3 | | 10.22 | 10.01 | 10.12 | 2383.82 | 2302.549 | |
| 4 | 14 | 10.06 | 10.13 | 10.14 | 2415.54 | 2337.59 | |
| 5 | | 10.13 | 10.06 | 10.08 | 2432.32 | 2367.84 | |
| 6 | | 10.16 | 10.03 | 10.1 | 2432.9 | 2363.78 | |
| 7 | 28 | 10.07 | 10.03 | 10.04 | 2424.75 | 2391.13 | |
| 8 | | 10.08 | 10.23 | 10.12 | 2410.79 | 2310.15 | |
| 9 | | 10.07 | 10.01 | 10.03 | 2424.27 | 2397.81 | |

In addition, Table 14 demonstrates the compressive strength results of the concrete. The compressive strength was determined after 7, 14 and 28 days of curing. The average 28 day compressive strength was about 40.0 MPa.

TABLE 14

Compressive strength of concrete.

| Sample # | Curing Period, days | Length, cm | Width, cm | Failure Load, kN | Compressive strength, MPa | Avg. comp strength, MPa |
|---|---|---|---|---|---|---|
| 1 | 7 | 10.04 | 10.04 | 388.94 | 38.58 | 36.73 |
| 2 |   | 10.04 | 10.08 | 351.96 | 34.78 |   |
| 3 |   | 10.22 | 10.01 | 376.78 | 36.83 |   |
| 4 | 14 | 10.06 | 10.13 | 407.32 | 39.97 | 39.57 |
| 5 |   | 10.13 | 10.06 | 370.21 | 36.33 |   |
| 6 |   | 10.16 | 10.03 | 432.26 | 42.42 |   |
| 7 | 28 | 10.07 | 10.03 | 400.41 | 39.64 | 40.60 |
| 8 |   | 10.08 | 10.23 | 409.82 | 39.74 |   |
| 9 |   | 10.07 | 10.01 | 427.61 | 42.42 |   |

The unit volume weight of the composite wall panel was further reduced when the outer layer of normal weight concrete was replaced by the lightweight perlite aggregate concrete. The unit weight and the compressive strength of perlite aggregate concrete are demonstrated in Table 15. The lightweight concrete was prepared with replacing coarse aggregate with the expanded perlite aggregate. The unit volume weight of the composite panel was observed to be around 1527 kg/m3 and 1395 kg/m3, respectively, when normal weight concrete outer layers were replaced by the lightweight perlite aggregate concrete at 10% and 15%. Compressive strength of 10% and 15% perlite aggregate concrete was 41.6 MPa and 31.1 MPa, respectively, which is sufficient to be used as structural concrete.

TABLE 15

Properties of composite panel if perlite aggregate concrete is used.

| Mix Constituents | Unit Weight, kg/m³ | 28 days compressive strength, MPa | Unit weight of composite wall panel, kg/m³ |
|---|---|---|---|
| 10% Perlite aggregate concrete | 1960 | 41.6 | 1527 |
| 15% Perlite aggregate concrete | 1771 | 31.1 | 1395 |

Modeling of Structural System

Figure 17:
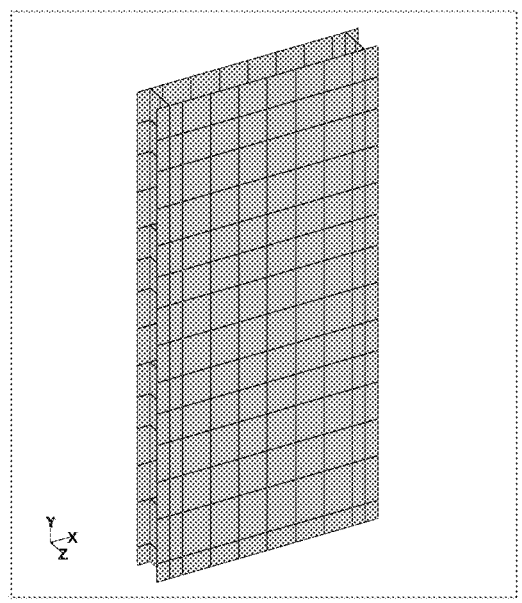
FIG. 17 illustrates a composite wall panel that is used in computer modeling.
Figure 18:
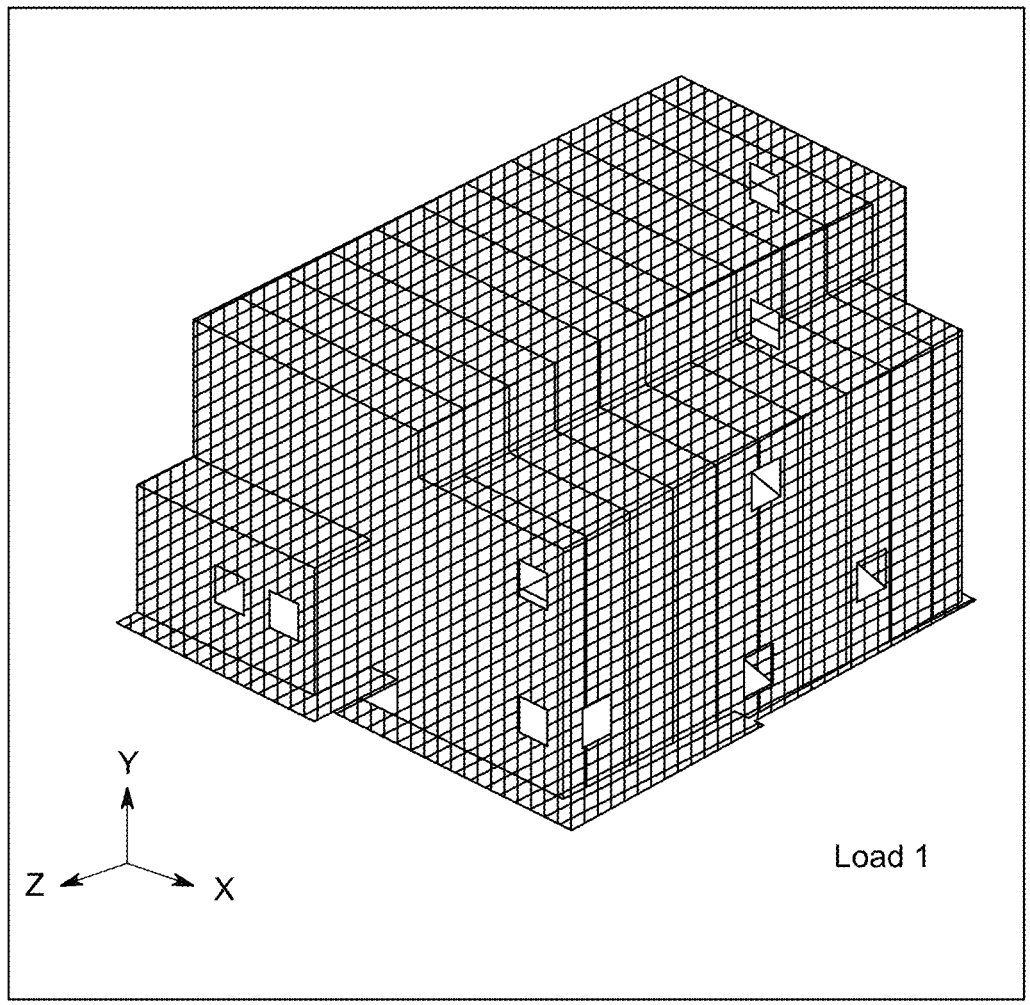
FIG. 18 illustrates a 3-D view of a building structure that is modelled.

In order to evaluate the structural performance of the system under different loading conditions, a typical housing unit was modeled as 3-D frame using proposed wall panel. The load bearing wall unit was modeled as finite plate elements exactly representing the proposed configuration of the wall with a cavity as well as openings (apertures) on the sides as illustrated in FIG. 3. Subsequently, the structure was subjected to 11 primary load cases and several combinations of loads which included gravity, wind and seismic according to the latest Saudi Building Code (SBC). An isometric view of the modeled wall panels is shown in FIG. 17. Also a 3-D view of a computer modelled building unit is shown in the FIG. 18. The performance of the load bearing wall was evaluated in terms of stresses generated in the panel. The primary load cases are shown in Table 16. However, as the architectural plans of different buildings are different, structural evaluation of each configuration shall be performed prior to adopting the proposed wall system. Hollow core slab was used as flooring system in present case.

TABLE 16

Primary load cases.

| Load Case | Designation | Description |
|---|---|---|
| LOAD 1 | EQ + X | Seismic in +X direction |
| LOAD 2 | EQ + Z | Seismic in +Z direction |
| LOAD 3 | EQ − X | Seismic in −X direction |
| LOAD 4 | EQ − Z | Seismic in −Z direction |
| LOAD 5 | DL | Dead Load |
| LOAD 6 | LL | Live Load on Floor |
| LOAD 7 | LR | Live Load on Roof |
| LOAD 8 | WL + X | Wind in +X direction |
| LOAD 9 | WL + Z | Wind in +Z direction |
| LOAD 10 | WL − X | Wind in −X direction |
| LOAD 11 | WL − Z | Wind in −Z direction |

DL: Dead load; LL: Live load on floor; LR: Live load on roof; EQ: Seismic load; WL: Wind load.

Figure 19A:
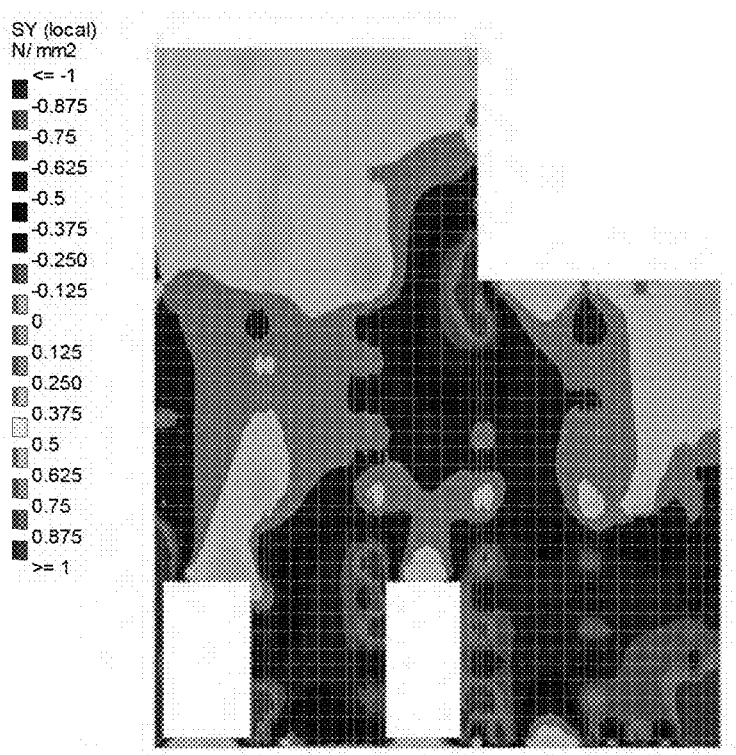
FIG. 19A represents a plate stress contour ($S_y$) of a first exterior wall panel of the building structure.
Figure 19B:
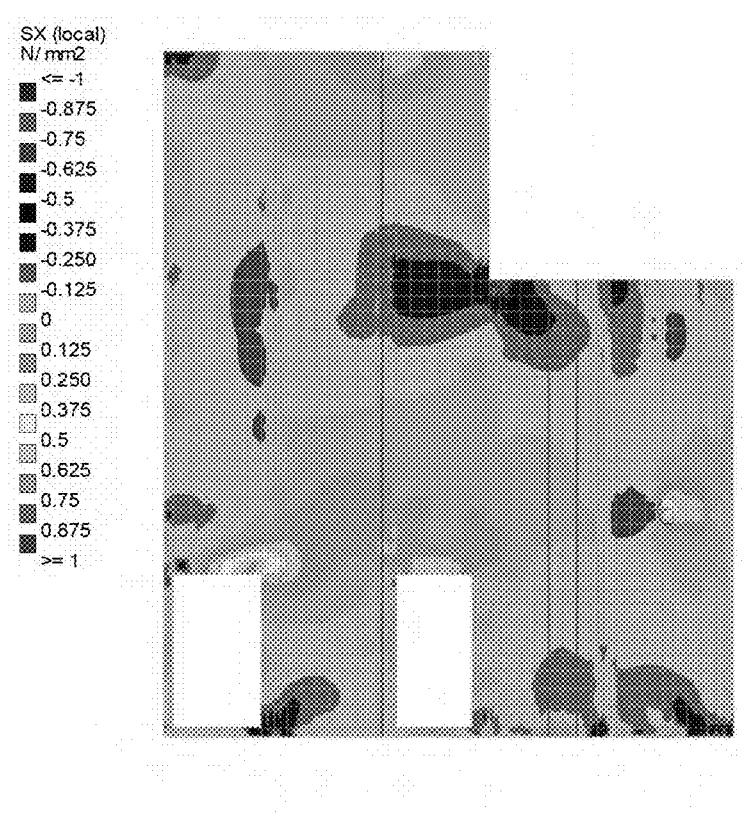
FIG. 19B represents a plate stress contour ($S_x$) of the first exterior wall panel of the building structure.

The housing unit was further subjected to all possible primary load cases as well as combinations of the loads. The results obtained in this evaluation may not be applicable to the other housing units. Detailed analysis is needed for each individual housing unit depending on the architectural configuration to ensure that the stresses and foundation pressures are within limits. However, this section provides some important results obtained in this evaluation. Stresses generated in the some of the critical walls are shown. FIGS. 19A and 19B show the Sy and Sx contours in the wall plate elements of a small exterior wall. The stress Sy is mostly compressive in nature having a maximum value at the corner of the opening of magnitude −2.98 MPa. Also a localized tensile stress is noted between 0.2 and 0.4 MPa at the corners of the openings. Further, a tensile stress Sx of about 1 MPa is noted at the corners. The maximum and minimum principal stresses in the plate elements of this particular wall are of magnitude 2.02 and −4.05 MPa, respectively.

Figure 19C:
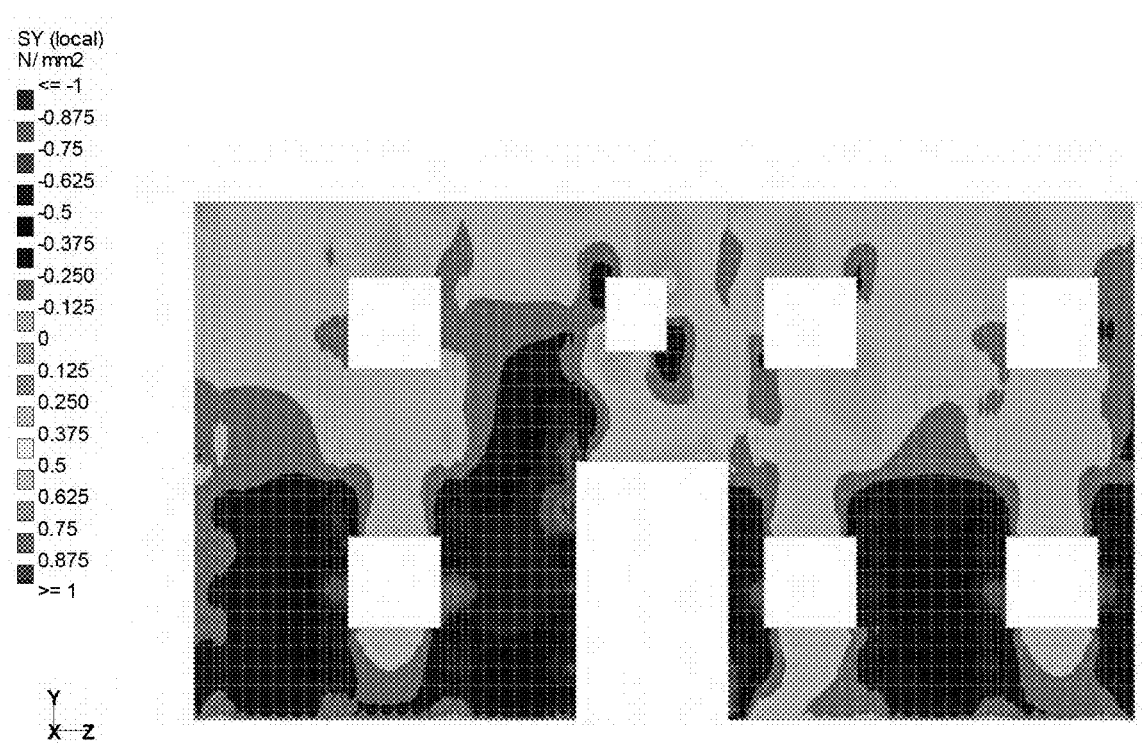
FIG. 19C represents a plate stress contour ($S_y$) of a second exterior wall panel of the building structure.
Figure 19D:
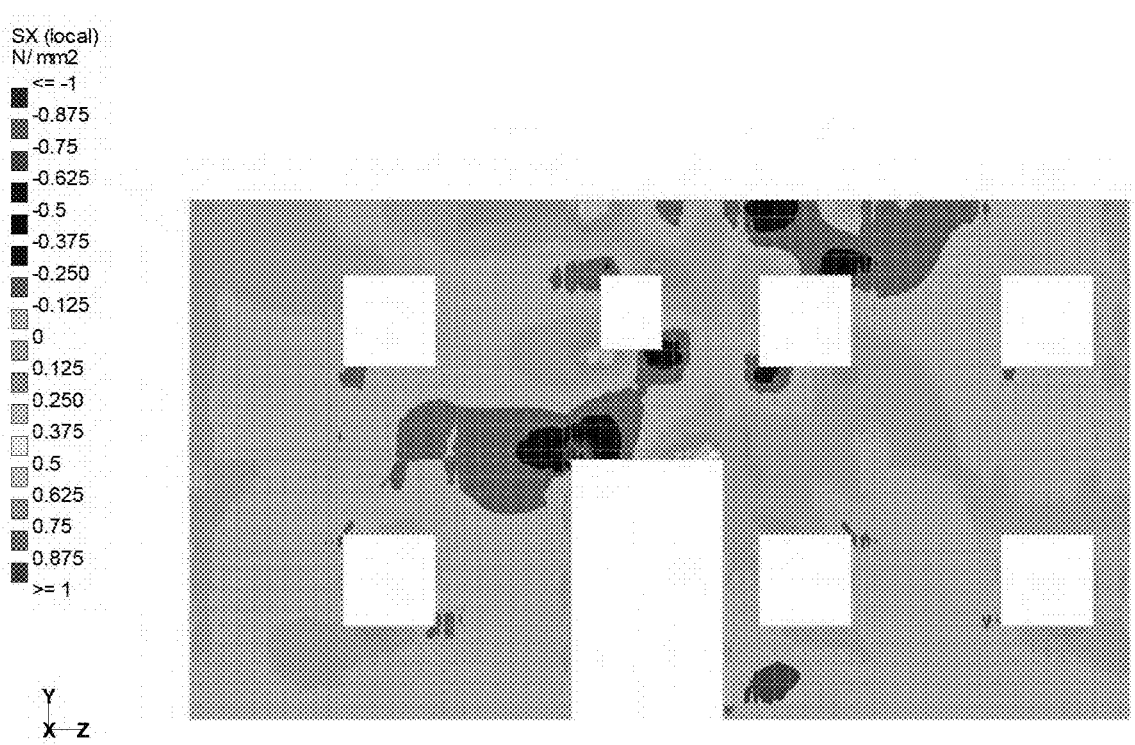
FIG. 19D represents a plate stress contour ($S_x$) of the second exterior wall panel of the building structure.

FIGS. 19C and 19D demonstrate the stresses Sx and Sy in the wall which has large number of openings for the door and windows. At the corners of openings there is minor stress concentration. The maximum compressive and tensile stress in the plate elements of the wall is −1.27 MPa (Sy) and 0.63 MPa (Sx), respectively. The maximum and minimum principal stresses in the plate elements are of the magnitude 1.46 and −2.73 MPa, respectively.

Based on the structural evaluation results the maximum compressive and tensile stress under various load combinations in the plate elements of the wall panel are of magnitude −3.286 MPa, in compression, and 1.53 MPa, in tension. The compressive stress in the wall elements of the building is substantially lower than the allowable compressive stress of 15.75 MPa based on the compressive strength of 35 MPa. The allowable tensile stress for 28 MPa concrete is 3.55 MPa. The maximum tensile stress generated in the walls is lower than this value at all locations.

According to the results, the composite wall system provided a robust construction technique for the housing units with several benefits including, thermally efficient, economical, lightweight, and flexible. The efficiency of the composite wall panel was further enhanced by utilizing lightweight expanded perlite aggregate concrete in the outer layers. The proposed system shows strong resistance to gravity and lateral loads.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A composite wall panel, comprising:
   a panel frame comprising
   a first planar concrete block,
   a second planar concrete block that is disposed substantially parallel to the first planar concrete block, and
   a first spacer and a second spacer, wherein the first and the second spacers are oriented axially with a long dimension of the first and the second planar concrete blocks and between the first and the second planar concrete blocks to form a cavity in the panel frame; and
   an insulating layer disposed in the cavity, wherein the insulating layer is formed from a concrete mixture that comprises
   45-55 wt % of cement,
   30-35 wt % of an aggregate,
   0.5-2.5 wt % of expanded polystyrene beads,
   0.5-5.0 wt % of a foam cement,
   12-18 wt % of water, and
   0.1-0.5 wt % of a superplasticizer, relative to the total weight of the insulating layer.

2. The composite wall panel of claim 1, wherein at least one aperture is present in the first and/or the second spacer.

3. The composite wall panel of claim 1, wherein at least one aperture is present in the first spacer and at least one aperture is present in the second spacer.

4. The composite wall panel of claim 1, wherein the first and the second spacers are vertically secured between the first and the second planar concrete blocks such that a tongue-groove structure is formed in the panel frame.

5. The composite wall panel of claim 1,
   wherein each of the first planar concrete block and the second planar concrete block has a thickness ranging from 20 to 100 mm, and
   wherein the insulating layer has a thickness ranging from 10 to 80 mm.

6. The composite wall panel of claim 1, which has a thermal conductivity ranging from 0.3-0.35 W/(m·K) as determined by ASTM C 177.

7. The composite wall panel of claim 1, which has a compressive strength in the range of 35-45 MPa as determined by ASTM C 150.

8. The composite wall panel of claim 1, which has a unit weight ranging from 1700-1900 kg/m$^3$.

9. The composite wall panel of claim 1, wherein an average diameter of the expanded polystyrene beads is in the range of 1-10 mm.

10. The composite wall panel of claim 1, wherein the aggregate is sand with an average particle size of less than or equal to 1.0 mm.

11. The composite wall panel of claim 1, wherein the superplasticizer is a polycarboxylate ether.

12. The composite wall panel of claim 1, wherein compositions of the first spacer, the second spacer, the first planar concrete block, and the second planar concrete block are substantially the same.

13. The composite wall panel of claim 1, wherein each of the first planar concrete block and the second planar concrete block comprises
   cement,
   a fine aggregate,
   a coarse aggregate comprising expanded perlite, and
   water,
   wherein a weight ratio of cement to water ranges from 3:1 to 1:1,
   wherein a weight ratio of the coarse aggregate to the fine aggregate ranges from 2:1 to 1:2, and
   wherein the coarse aggregate is present at a weight percent ranging from 5-20 wt %, relative to the total weight of the first planar concrete block or the second planar concrete block.

14. The composite wall panel of claim 13,
   wherein the cement has a unit weight ranging from 300-500 kg/m$^3$,
   wherein the fine aggregate has a unit weight ranging from 600-800 kg/m$^3$, and
   wherein the coarse aggregate has a unit weight ranging from 1000-1300 kg/m$^3$.

15. The composite wall panel of claim 13, wherein an average particle size of the fine aggregate is less than or equal to 1 mm and an average particle size of the coarse aggregate is greater than 1 mm.

16. The composite wall panel of claim 13, which has a thermal conductivity ranging from 0.2-0.3 W/(m·K) as determined by ASTM C 177.

17. The composite wall panel of claim 13, which has a compressive strength in the range of 30-45 MPa as determined by ASTM C 150.

18. The composite wall panel of claim 13, which has a unit weight ranging from 1300-1600 kg/m$^3$.

19. A wall assembly, comprising:
   a plurality of the composite wall panels of claim 4 that are vertically jointed to one another via the tongue-groove structure,
   wherein at least one aperture is present in the first spacer and at least one aperture is present in the second spacer, and
   wherein the at least one aperture of the first spacer is disposed directly adjacent to the at least one aperture of the second spacer of an adjacent composite wall panel.

20. The wall assembly of claim 19, wherein at least one utility line is embedded in the insulating layer of the plurality of the composite wall panels.

* * * * *